United States Patent
Vivekraja et al.

(10) Patent No.: US 11,941,528 B2
(45) Date of Patent: Mar. 26, 2024

(54) NEURAL NETWORK TRAINING IN A DISTRIBUTED SYSTEM

(71) Applicant: Amazon Technologies, Inc., Seattle, WA (US)

(72) Inventors: Vignesh Vivekraja, Santa Clara, CA (US); Thiam Khean Hah, Milpitas, CA (US); Randy Renfu Huang, Morgan Hill, CA (US); Ron Diamant, Santa Clara, CA (US); Richard John Heaton, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 1165 days.

(21) Appl. No.: 16/588,603

(22) Filed: Sep. 30, 2019

(65) Prior Publication Data

US 2021/0097396 A1     Apr. 1, 2021

(51) Int. Cl.
| | |
|---|---|
| *G06N 3/084* | (2023.01) |
| *G06N 3/063* | (2023.01) |
| *G06N 3/045* | (2023.01) |
| *G06N 3/10* | (2006.01) |

(52) U.S. Cl.
CPC ............. *G06N 3/084* (2013.01); *G06N 3/045* (2023.01); *G06N 3/063* (2013.01); *G06N 3/10* (2013.01)

(58) Field of Classification Search
CPC .................................. G06N 3/084; G06N 3/10
See application file for complete search history.

(56) References Cited

U.S. PATENT DOCUMENTS

| | | |
|---|---|---|
| 10,360,500 B2 | 7/2019 | Kabul et al. |
| 11,270,201 B2 | 3/2022 | Sridharan et al. |
| 11,423,254 B2 | 8/2022 | Prakash et al. |
| 2019/0114537 A1* | 4/2019 | Wesolowski ........... G06N 3/084 |

(Continued)

FOREIGN PATENT DOCUMENTS

WO     2017116924 A1     7/2017

OTHER PUBLICATIONS

U.S. Appl. No. 16/588,645, "Neural Network Training in a Distributed System," filed Sep. 30, 2019.

(Continued)

*Primary Examiner* — Ryan C Vaughn
(74) *Attorney, Agent, or Firm* — Kilpatrick Townsend & Stockton LLP

(57) ABSTRACT

Methods and systems for performing a training operation of a neural network are provided. In one example, a method comprises: performing backward propagation computations for a second layer of a neural network to generate second weight gradients; splitting the second weight gradients into portions; causing a hardware interface to exchange a first portion of the second weight gradients with the second computer system; performing backward propagation computations for a first layer of the neural network to generate first weight gradients when the exchange of the first portion of the second weight gradients is underway, the first layer being a lower layer than the second layer in the neural network; causing the hardware interface to transmit the first weight gradients to the second computer system; and causing the hardware interface to transmit the remaining portions of the second weight gradients to the second computer system.

20 Claims, 18 Drawing Sheets

(56) References Cited

U.S. PATENT DOCUMENTS

2020/0053029 A1* 2/2020 Javadi .................. G06N 3/08
2020/0118000 A1 4/2020 Schmidt et al.

OTHER PUBLICATIONS

Amin et al., "Parallel Backpropagation Neural Network Training Techniques using Graphics Processing Unit," International Journal of Advanced Computer Science and Applications, Jan. 1, 2019, pp. 563-566, vol. 10, No. 2, Available Online at https://thesai.org/Downloads/Volume10No2/Paper_70-Parallel_Backpropagation_Neural_Network_Training.pdf.
Huo et al., "Decoupled Parallel Backpropagation with Convergence Guarantee," Jul. 21, 2018, 12 pages, Available Online at https://arxiv.org/pdf/1804.10574.pdf.
WO Application No. PCT/US2020/051791, International Search Report and Written Opinion, dated Dec. 11, 2020, 15 pages.
Devarakonda, Aditya, Maxim Naumov, and Michael Garland. "Adabatch: Adaptive batch sizes for training deep neural networks." arXiv preprint arXiv:1712.02029 (2017). (Year: 2017).
Zhao, Tuo, et al. "Accelerated mini-batch randomized block coordinate descent method." Advances in neural information processing systems 27 (2014). (Year: 2014).
Zhu, Hongyu, et al., "Tbd" Benchmarking and analyzing deep neural network training. arXiv preprint arXiv:1803 06905 (2018). (Year: 2018).
Naumov, Maxim. "Parallel complexity of forward and backward propagation." arXiv preprint arXiv:1712.06577 (2017). (Year: 2017).
U.S. Appl. No. 16/588,645, Non-Final Office Action, dated Jul. 21, 2022, 48 pages.

* cited by examiner

NEURAL NETWORK TRAINING IN A DISTRIBUTED SYSTEM

BACKGROUND

Artificial neural networks are computing systems with an architecture based on biological neural networks. An artificial neural network can include a set of weights. Through computations, the weights can be combined with input data to extract information, and a decision can be made based on the information. For example, for a computer vision application to detect an object, the artificial neural network can combine the weights with an input image to extract certain features of the object from the image. Based on the extracted features, the artificial neural network can generate a decision of whether the object is in the image.

The set of weights of an artificial neural network can be generated/updated by a training process, in which the artificial neural network can learn about how to perform a certain computing task for an application. The training process involves supplying the artificial neural network with training input data, which can be labelled with a reference output set which supports a particular decision (e.g., a detection or a non-detection of an object in an image). The artificial neural network can perform computations to combine the weights with the training input data to generate a training output data set, and the training output data set can be compared against the reference output data set to generate a set of differences. During the training, different training input data sets can be provided to the artificial neural network to generate different training output data sets. The set of weights of the artificial neural network can be adjusted based on an objective such as minimizing the differences between the training output data sets and the reference output data sets.

To improve the likelihood of the artificial neural network generating a correct decision, typically a large volume of training input data covering a large number of operation scenarios is used to train an artificial neural network. As a result, a training operation typically requires a lot of time and computation resources.

BRIEF DESCRIPTION OF THE DRAWINGS

Various embodiments in accordance with the present disclosure will be described with reference to the drawings, in which.

DETAILED DESCRIPTION

Figure 1:
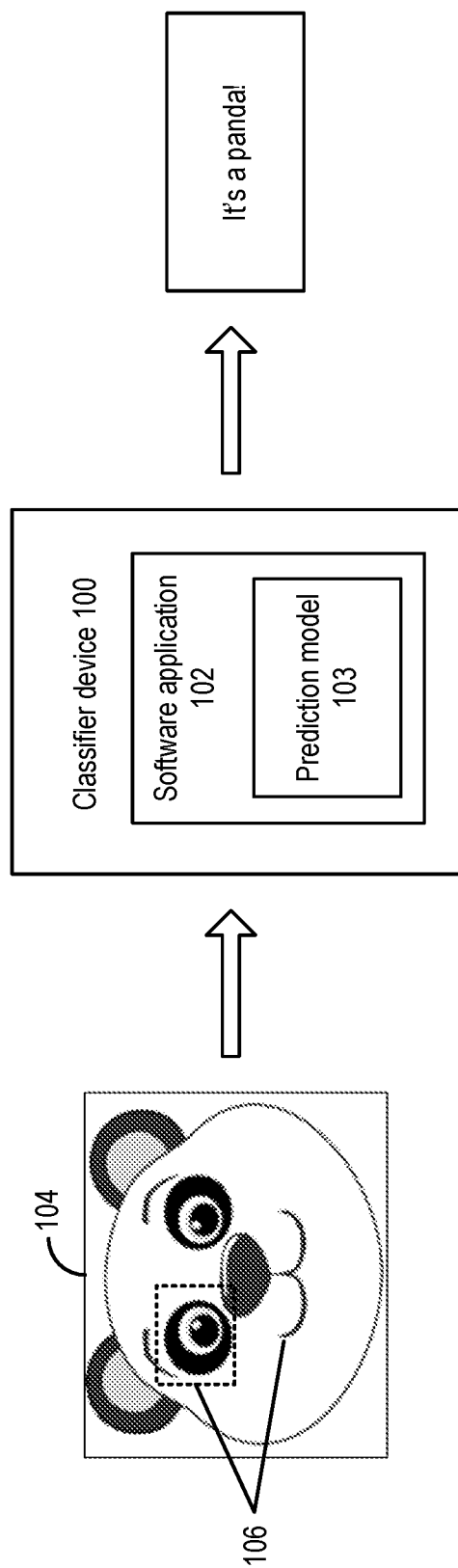
FIG. 1 illustrates an example of a classifier device that uses techniques disclosed herein to process data.

Examples of the present disclosure relate to neural network processing, and more specifically, to performing a training process of a neural network in a distributed system.

An artificial neural network (hereinafter, neural network) is typically implemented in a computing system to have an architecture based on biological neural networks, and to process input data in an analogous fashion as biological neural networks. A neural network typically includes a number of cascading neural network layers, with each layer including a set of weights. In an inference operation, a first neural network layer can receive an input data set, combine the input data set with the weights (e.g., by multiplying the input data set with the weights and then summing the products) to generate a first output data set for the neural network layer, and propagate the output data set to a second neural network layer, in a forward propagation operation. The second neural network layer performs another forward propagation operation on the first output data set from the first neural network layer to generate a second output data set, and propagate the second output data set to higher neural network layers. The forward propagation operations can start at the first neural network layer and end at the highest neural network layer. The forward propagation operation at each neural network layer can represent different stages of extraction and processing of information from the input data set. A decision can then be made based on the output data of the highest neural network layer. For example, each neural network layer can extract and/or process features from an image, and a decision of whether an object is in the image can be generated based on a result of processing the extracted features at the neural network layers.

The set of weights of the neural network can be generated and/or updated by a training process to improve the likelihood of the neural network generating a correct decision. An example training process can use a gradient descent scheme. Specifically, as part of the training process, forward propagation operations can be performed on a training input data set, using the set of weights at each neural network layer, to generate a training output data set at the highest level neural network layer. The training output data set can be compared with a reference output data set that supports a particular decision. A set of input data gradients can be generated based on, for example, differences between the training output data set and the reference output data set.

As part of the training process, each neural network layer can then perform a backward propagation process to adjust the set of weights at each neural network layer. Specifically, the highest neural network layer can receive the set of input data gradients and compute, in a backward propagation operation, a set of first data gradients and a set of first weight gradients based on applying the set of weights to the input data gradients in similar mathematical operations as the forward propagation operation. The highest neural network layer can adjust the set of weights of the layer based on the set of first weight gradients, whereas the set of first data gradients can be propagated to the second highest neural network layer to influence the adjustment of the set of weights of the previous neural network layer. The backward propagation operations can start from the highest neural network layer and end at the first neural network layer. The set of weights at each neural network layer can be adjusted, to complete one iteration of the training process. The training process can be repeated for the same input data set for a number of iterations until a loss objective (e.g., a threshold input data gradient) is achieved.

A training process is typically a very time-consuming process due to the sequential nature and data dependency among the operations involved in the training process. Specifically, as described above, in a training process a forward propagation operation is first performed at each neural network layer to compute a training output data set, and then input data gradients are computed based on the training output data set (and reference output data set), and then a backward propagation operation is performed at each neural network layer to compute the weight gradients, which is then followed by the updating of the weights at each neural network layer. As the backward propagation operations depend on the forward propagation operations, the two sets of operations cannot performed in parallel. Moreover, due to data dependency among the neural network layers, the forward propagation operations and the backward propagation operations also need to be performed sequentially for each neural network layer. The lack of parallelism can drastically increase the training time, which is further increased when multiple iterations of the training process on the same input data set are performed to achieve the loss objective. Moreover, the training process typically involves supplying the neural network with multiple sets of training input data to cover different operation conditions, such that the neural network can be trained to provide a correct decision under those different operation conditions. The computing system that implements the neural network will need to perform additional training processes to process the additional input data sets, which will further increase the training time. Coupled with the fact that the training process typically requires a higher precision than the inference operation, a slow training process can put a lot of stress on the computation resources.

One way to accelerate a training process is by using a distributed system, to distribute the training process across multiple computing systems, which can each be configured as a worker node. A training input data set can be split into multiple portions, with each portion to be processed by a worker node. Each worker node can perform the forward and backward propagation operations independently, and in parallel with other, based on a portion of the training input data, to generate a set of weight gradients for each neural network layer. Each worker node can exchange its set of weight gradients with other worker nodes, and average its set of weight gradients and the sets of weight gradients received from other worker nodes. Each computing node can have the same set of averaged weight gradients, and can then update a set of weights for each neural network layer based on the averaged weight gradients.

Distributing the training process across multiple worker nodes can reduce the amount of training input data to be processed at each worker node, which can reduce the execution time of the forward and backward propagation operations at each neural network layer and accelerate the training process. However, the exchange of weight gradients among the worker nodes can introduce a substantial bottleneck. For example, in a case where the distributed system is in a cloud infrastructure and worker nodes exchange weight gradients with each other by sending network packets, the network latency can be substantial relative to the execution times of the forward/backward propagation operations. The network latency can diminish the reduction in the training time brought by the distributed system, or even increase the training time.

Examples of the present disclosure relate to neural network processing, and more specifically, to performing a training process of a neural network in a distributed system. In one example, a distributed system includes a plurality of worker nodes. Each worker node receives a portion of a training input data set and performs forward propagation computations on the respective portion to generate input data gradients. Following the generation of input data gradients, each worker node can perform backward propagation operations to generate data gradients and weight gradients, and exchange the weight gradients with other worker nodes.

To accelerate the training process, the worker node can perform some of backward propagation operations and the exchange of the weight gradients in parallel. Specifically, the worker node can perform a backward propagation operation for a higher neural network layer (e.g., a second neural network layer) based on the input data gradients to generate second data gradients and second weight gradients, and then perform a backward propagation operation for a lower neural network layer (e.g., a first neural network layer) to generate first data gradients and first weight gradients. While the backward propagation operation for the first neural network layer is underway, the worker nodes can also perform the exchange of the second weight gradients among the worker nodes, as well as the subsequent updating of the set of weights at the second neural network layer based on the exchanged second weight gradients. As such, the backward propagation operation for a neural network layer can be performed in parallel with the weight gradient exchange and updating of weights for a higher neural network layer. The parallelism does not affect the weights update operation for the higher neural network layer nor the backward propagation operation for the lower neural network layer as the two operations have no data dependency between each other. Moreover, by parallelizing the exchange of weight gradients of the higher neural network layer with the backward propagation operation of the lower neural network layer, instead of serializing these two operations, the effect of network latency experienced during the exchange of weight gradients can be reduced, which can further accelerate the training process.

In some examples, the exchange of the first weight gradients of the lower neural network layer can be prioritized with respect to the exchange of the second weight gradients of higher neural network layer. The prioritizing can be based on, for example, the worker node exchanging at least some of the first weight gradients followed by at least some of the second weight gradients, even though the second weight gradients are generated prior to the first weight gradients at the worker node. Such arrangements can be advantageous in shortening the training time. Specifically, the exchange of weight gradients and updating of the weights for one neural network layer has to be serialized with the forward propagation operation at that neural network layer due to data dependency. The time window between the backward propagation operation and the forward propagation operation is typically shorter for lower layers than higher layers due to the forward propagation operations and the backward propagation operations being performed in opposite orders across neural network layers. By prioritizing the lower neural network layer to perform the exchange of weight gradients first, the wait time for the exchange of the weight gradients of the lower neural network can be reduced. Moreover, the exchange of weight gradients for higher neural network layer can be performed in parallel with the forward propagation of the lower neural network layer. As a result, the overall training time can be reduced.

In some examples, to support the aforementioned prioritizing scheme, the weight gradients generated for each neural network node can be split into a plurality of portions, with each portion associated with an exchange task. The size of a portion of the weight gradients included in an exchange task can be based on various factors including for example, a predetermined threshold level of network efficiency in transmitting the weight gradients, a target time of completion of the training process, etc. Each exchange task includes transmission of the associated portion of the weight gradients by a worker node and reception of a corresponding portion of the weight gradients from each of the other worker nodes. The exchange tasks can be stored in a buffer managed by an arbiter. The buffer includes a plurality of entries. Each entry can store an exchange task, as well as a status of completion of the exchange task. The buffer also includes a write pointer and a read pointer. The write pointer points at the empty entry to receive the next exchange task, while the read pointer points at the most recently stored exchange task. In some examples, the buffer can be implemented as a stack. In other examples, other data structures, such as a queue, a linked-list, or other types of buffers can be used to store and manage the exchange tasks.

After generating second weight gradients for a higher neural network layer, a worker node can split the weight gradients into portions, and store a set of first exchange tasks for each portion sequentially into the buffer. As each first exchange task is stored, the read pointer and the write pointer are also adjusted accordingly. Before the next set of exchange tasks are stored, the worker node can start processing the most recently stored first exchange task indicated by the read pointer. After the first exchange is complete (where the worker node has transmitted the portion of second weight gradients and has received a corresponding portion of second weight gradients from each of the other worker nodes), the status of completion of that entry can be marked complete, and the worker node can process the second most recently stored first exchange task. The worker node can process the rest of the first exchange tasks in a reverse order from the storing of the tasks.

While the worker node is processing the set of first exchange tasks, the worker node may also store a set of second exchange tasks associated with the first weight gradients into the buffer. Both the read and the write pointers can then be moved accordingly based on the storing of the set of second exchange tasks. The read pointer can point to the most recently stored second exchange task. As a result of the storing of the new exchange task, the worker node can complete the first exchange task in progress and then suspend the processing of the remaining first exchange tasks. The worker node can then start processing the most recently stored second exchange task. Before the next set of exchange tasks (for the next lower layer) is stored into the buffer, the worker node can process the rest of the second exchange tasks while performing the forward propagation operations, followed by the remaining first exchange tasks. The read pointer can traverse through the buffer following a reverse order from the storing of the tasks.

In the example above, exchange tasks that are stored later are processed first by moving the read pointer with the write pointer. Such arrangements enable prioritizing the exchange tasks of lower neural network layers over those of higher neural network layers, as the exchange tasks of lower neural network layers are typically generated later (and thus stored into the buffer later) than the exchange tasks of higher neural network layers. In some examples, the read pointer can also be controlled by an arbiter which can determine the priority of the newly stored exchange tasks. If the arbiter determines that the newly stored exchange tasks are of highest priority, the arbiter can move the read pointer to the entries that store the high priority exchange tasks to process those tasks first.

With the described techniques, at least some of the exchange operations of weight gradients can be performed in parallel with the backward propagation operations and forward propagation operations in a distributed system, which can further accelerate the training process. Moreover, by prioritizing the exchange of weight gradients of lower neural network layers over higher neural network layers, the wait time between two iterations of a training process, which is contributed by the time it takes for the lowest neural network layer to finish exchange of weight gradients and updating of weights, can be shortened, which can further accelerate the training process. All these can improve the efficiency of the training process and can reduce the stress on computation resources.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

FIG. 1 illustrates an example classifier device 100 that uses techniques disclosed herein to process data. Classifier device 100 can be, for example, a computing device operating a software application 102 and a prediction model 103 to predict information included in a data sequence, and perform a predetermined function based on the prediction. For example, classifier device 100 can be part of an image recognition service provided to identify certain objects (e.g., text, a person, etc.) from an image. It is understood that the image recognition service is merely provided as an illustrative example, and that techniques disclosed herein can be used for other data processing applications including, for example, text-based data processing (e.g., processing of search queries), audio data processing, etc. Moreover, classifier device 100 may operate a number of different prediction models to process different input data, either in parallel or at different times.

In some examples, the image recognition service can be provided in a multi-tenant compute service system. The multi-tenant compute service system may typically include a plurality of servers that can host data and be used by multiple clients or organizations to run instances, such as virtual machine instances or bare-metal instances (e.g., operating systems that run directly on the server hardware). In most instances, such as bare-metal or virtual machine instances, a multi-tenant compute service system may be allocated to a client when the client needs them and decommissioned when they are no longer needed, such that the resources can be reallocated to other clients. In the present disclosure, the terms "tenant," "client," and "customer" may be used interchangeably, although such terms do not necessarily imply the existence of any particular business arrangement. The term "instance" may refer to, for example, an instance that is executed directly on server hardware or as a virtual machine. Different types of instances generally correspond to different hardware functions and/or arrangements of hardware (e.g., different amounts of available memory and/or processing hardware). In the example of FIG. 1, the multi-tenant compute service system may provide the image recognition service when the client needs it, and the service is decommissioned when it is no longer needed, such that the resources supporting the image recognition service (e.g., access to software application 102, and the underlying hardware resources for processing software application 102) can be reallocated to other clients. Different clients (or one client) may request application 102 to perform processing of different input data using the same or different prediction models including prediction model 103.

In the example of FIG. 1, software application 102 can receive pixel data of an image 104 from a user. Image 104 may include an array of pixels. Software application 102 can perform analysis on the pixel data, and predict one or more objects 106 depicted in image 104. The analysis may include, for example, comparing the pixel data against a set of predetermined features data. The predetermined features data may include data associated with a set of predetermined visual image features such as a nose object, a mouth object, etc. The predetermined features data may also include data associated with non-visual image features, or a combination of visual and non-visual image features. As to be discussed in more detail below, software application 102 may employ prediction model 103 to compute a set of scores based on the pixel data of image 104. The set of scores may represent, for example, the likelihood of image 104 including the image features represented by the features data. Software application 102 can then determine other information about the content of image 104 based on the scores. For example, based on the scores, software application 102 can determine that image 104 is an image of, for example, a panda, a cat, or other objects.

Prediction model 103 can be in the form of an artificial neural network. The artificial neural network may include a plurality of processing nodes, with each processing node configured to process part of the input pixel data, or to further process the intermediate outputs from other processing nodes. FIG. 1 illustrates an example of prediction model 103 that uses techniques disclosed herein. In FIG. 1, prediction model 103 may be a multi-layer neural network such as a deep neural network (DNN), a convolutional neural network (CNN), etc. Prediction model 103 may include an input layer 207, a set of intermediate layers including intermediate layers 209 and 211, and an output layer (not shown in FIG. 2A). It is understood that prediction model 103 can also include other different types of neural networks including, for example, long short-term memory (LSTM), multilayer perceptron (MTP), multiscale densenet (MSD-NET), etc.

Layer 207 may process pixel data representing different portions of image 104. For example, in the example of FIG. 2A, layer 207 may process the pixel data of image 204. Each processing node of layer 207 is assigned to receive a pixel value (e.g., $x_0, x_1, x_2, \ldots, x_n$) corresponding to a predetermined pixel within image 104, and transmit one or more weights with the received pixel value to layer 209. In a case where prediction model 203 is a DNN, each processing node of layer 207 can be assigned a set of weights defined based on a matrix W1. Each processing node of layer 207 can send the received pixel value and the assigned weights to each processing node of layer 209. In a case where prediction model 103 is a CNN, groups of the processing nodes of layer 207 may share a set of weights, and each group may send the set of weights and the pixel values received by the group of processing nodes to a single processing node of layer 209. Different neural network models may include different topologies (e.g., including a different number of layers, different connections between layers, etc.), and/or include a different set of weights for each layer.

Layer 209 may process the scaled outputs from layer 207 to generate a set of intermediate outputs. For example, assuming processing node 210a of layer 209 is connected to n processing nodes in layer 207, processing node 210a may generate a sum of the scaled outputs received from layer 207 based on the following equation:

$$\text{sum}_{210a} = \Sigma_{i=0}^{n}(W1_i \times x_i) \quad \text{(Equation 1)}$$

Here, $\text{sum}_{210a}$ represents an intermediate output generated by processing node 210a. $W1_i \times x_i$ represents a scaling of a particular pixel value (e.g., $x_0$) with the associated weight (e.g., $W1_0$) by a processing node of layer 207. In a case where prediction model 103 is a DNN, each processing node of layer 209 may generate the sum based on the scaling of pixel values from each processing node of layer 207, and then generate a sum (e.g., $\text{Sum}_{210a}$) by summing the scaled pixel values. The sum may also represent a dot-product between an input vector comprising a number of elements (e.g., pixel values) and a weight vector (e.g., W1). In some examples, a bias can also be added the scaled outputs to generate the intermediate output.

In a case where prediction model 103 is a CNN, each processing node of layer 209 may generate the intermediate output based on the scaling of pixel values from a group of processing nodes of layers 207. The intermediate output may represent a convolution result between a group of pixel values and a filter comprising the weight values. FIG. 2B illustrates an example of a convolution operation that layer 209 may perform. In FIG. 2B, filter 230 may include a two-dimensional array of weights. The weights in filter 230 may represent a spatial distribution of pixels for certain features to be detected from the image. The two-dimensional array may have a height of R rows and a width of S columns, and is typically smaller than an input image with a height of H pixels and a width of W pixels. Each weight may be mapped to a pixel in a rectangular block of pixel values with the same R rows and S columns. A processing node of layer 209 (e.g., processing node 210a) can receive, from a group of processing nodes of input layer 207, a group 240 of pixel values corresponding to a first rectangular block of pixels from the input image, which corresponds to a first stride location of filter 230, and generate a convolution output 242 based on a summation of multiplication results between each weight of filter 230 and each corresponding pixel in group 240 according to Equation 1, to generate a dot-product between a matrix represented by filter 230 and a matrix represented by group 240. Another processing node of layer 209 can also receive, from another group of processing nodes of input layer 207, a group 244 of pixel values corresponding to a second rectangular block of pixels from the input image corresponding to a second stride location of filter 230, and generate a convolution output 246 based on a summation of multiplication results between each weight of filter 230 and each corresponding pixel in group 244 according to Equation 1, to generate a dot-product between the matrix of filter 230 and a matrix represented by group 240. In some examples, each convolution output in FIG. 2B (e.g., convolution output 242, convolution output 346, etc.) can correspond to the output of a processing node of layer 209. In some examples, the pixel data in the input image may be referred to as an input feature map to indicate that the pixels are processed by the same filter (or same sets of filters) corresponding to certain feature(s). The convolution outputs may be referred to as an output feature map to indicate that the output is the result of processing an input feature map with the filter.

As shown in FIG. 2B, the convolution operations can be arranged in a sliding-window such that the second rectangular block overlaps, or is otherwise adjacent to, the first rectangular block in the input image. For example, in the example of FIG. 2B, D may be a distance of stride (in pixel) of the sliding-window for each convolution operation, such that the block of pixels corresponding to group 244 may be situated at a distance D (in terms of pixels) from the block of pixels corresponding to group 240, and the next block of pixels may also be situated at the same distance D from group 244. Other processing nodes of layer 209 may also receive groups of pixels corresponding to other rectangular blocks and generate other intermediate outputs. The convolution outputs can be part of a convolution output array. The array of convolution outputs can have a smaller height and a smaller width than the input image. Rectangular blocks of the convolution outputs can be further grouped, and convolution operations can be performed at layer 211 between the groups of convolution outputs and another set of filter weights to generate another set of convolution outputs.

Referring back to FIG. 2A, one processing node of layer 209 may be configured to generate the convolution output elements of one convolution output array, and a set M of processing nodes of layer 209 can correspond to a set M of convolution output arrays. The processing node of layer 209 can also process each convolution output with an activation function to generate an activation output. The activation function may translate the convolution output into a decision of whether to forward the convolution output to intermediate layer 211 to influence the classifier decision (analogous to the firing of a biological neuron). An example of the activation function can be a rectified linear unit (ReLU) defined according to the following equation:

$$ReLU(x) = \begin{cases} x & \text{for } x \geq 0 \\ 0 & \text{for } x < 0 \end{cases} \quad \text{(Equation 2)}$$

In addition to ReLU, other forms of activation function can also be used including, for example, a softplus function (which can be a smooth approximation of a ReLU function), a hyperbolic tangent function (tan h), an arc tangent function (arctan), a sigmoid function, a Gaussian function, etc.

A processing node of layer 209 (e.g., processing node 210a) may process the sum with the ReLU function to generate a first output of layer 209 based on the following equation:

$$\text{first\_output}_{210a} = ReLU(Sum_{210a}) \quad \text{(Equation 3)}$$

Optionally, prediction model 103 may include a pooling layer to reduce the number of intermediate outputs (e.g., $sum_{210a}$) of layer 209. The pooling layer may group the intermediate outputs and perform a pooling operation on each group. The pooling operation may include max pooling (e.g., selecting a maximum intermediate output within the group), min pooling (e.g., selecting a minimum intermediate output), average pooling (e.g., finding an average of each group), summation pooling (finding a sum of each group), etc., and the reduced intermediate outputs can be processed by the activation function to generate first outputs of layer 209. The pooling operation can be performed to reduce the computation cost associated with activation function processing.

Layer 211 may further process the scaled intermediate outputs from layer 209 by, for example, performing additional convolution operations based on different sets of filters. The outputs from each processing node of layer 211 may be forwarded to other higher intermediate layers, or to an output layer (not shown in FIG. 2A). The output layer may form an output vector representing, for example, a probability that certain features are included in image 104, and/or a probability that image 204 includes an image of a panda. For example, the output vector may be compared against a reference vector associated with a nose object of a panda, or a reference vector associated with a panda. A decision about whether image 104 is an image of a panda can be determined based on the comparison result.

Figure 2A:
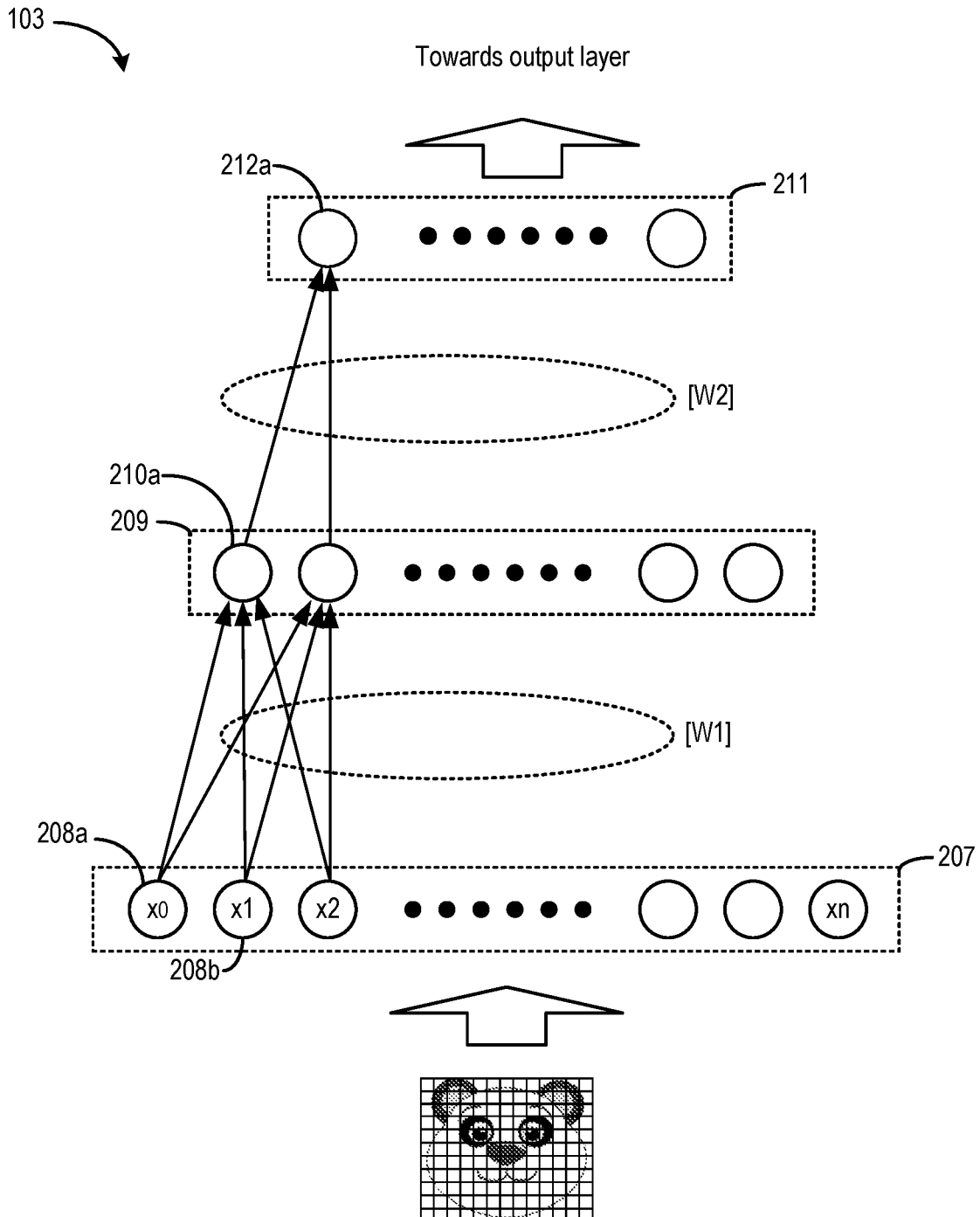
FIGS. 2A-2B are simplified block diagrams illustrating a prediction model and the computations that use techniques disclosed herein, according to certain aspects of the present disclosure.
Figure 2B:
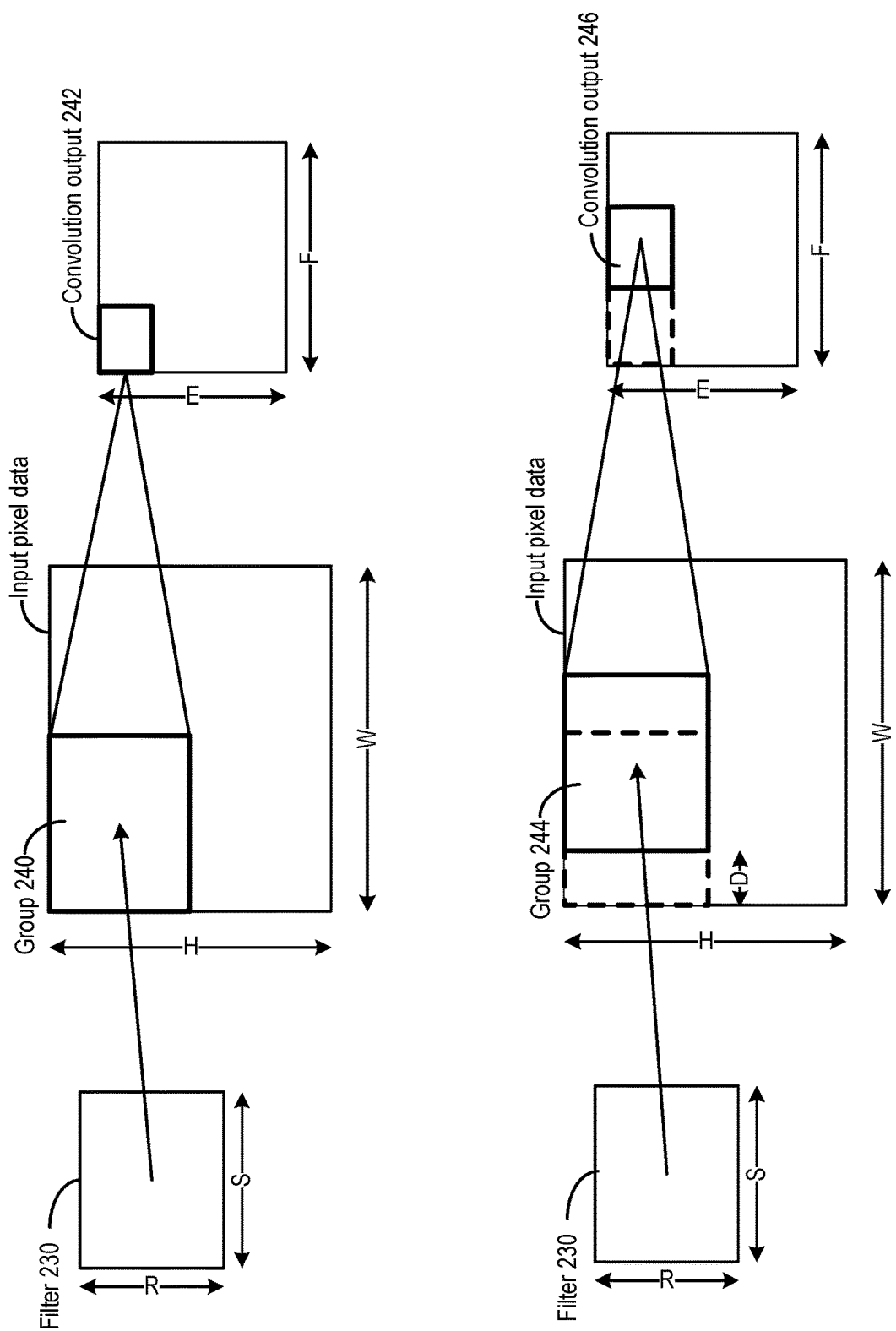

The weights and filter coefficients described in FIG. 2A and FIG. 2B can be generated and updated by a training process, to improve the likelihood of prediction model 103 generating a correct decision. Referring to the examples of FIG. 2A and FIG. 2B, prediction module 103 can be trained based on a set of training images. The training images can include images of different pandas, images of other animals and other artifacts, etc. Prediction model 103 can process those images and generate different output vectors. The weights in the neural network layers of prediction model 103 can be updated to maximize the number of correct decisions (e.g., detection of a panda in training images that contain a panda, non-detection of a panda in training images that do not contain an panda, etc.) by the prediction model 103.

Figure 3A:
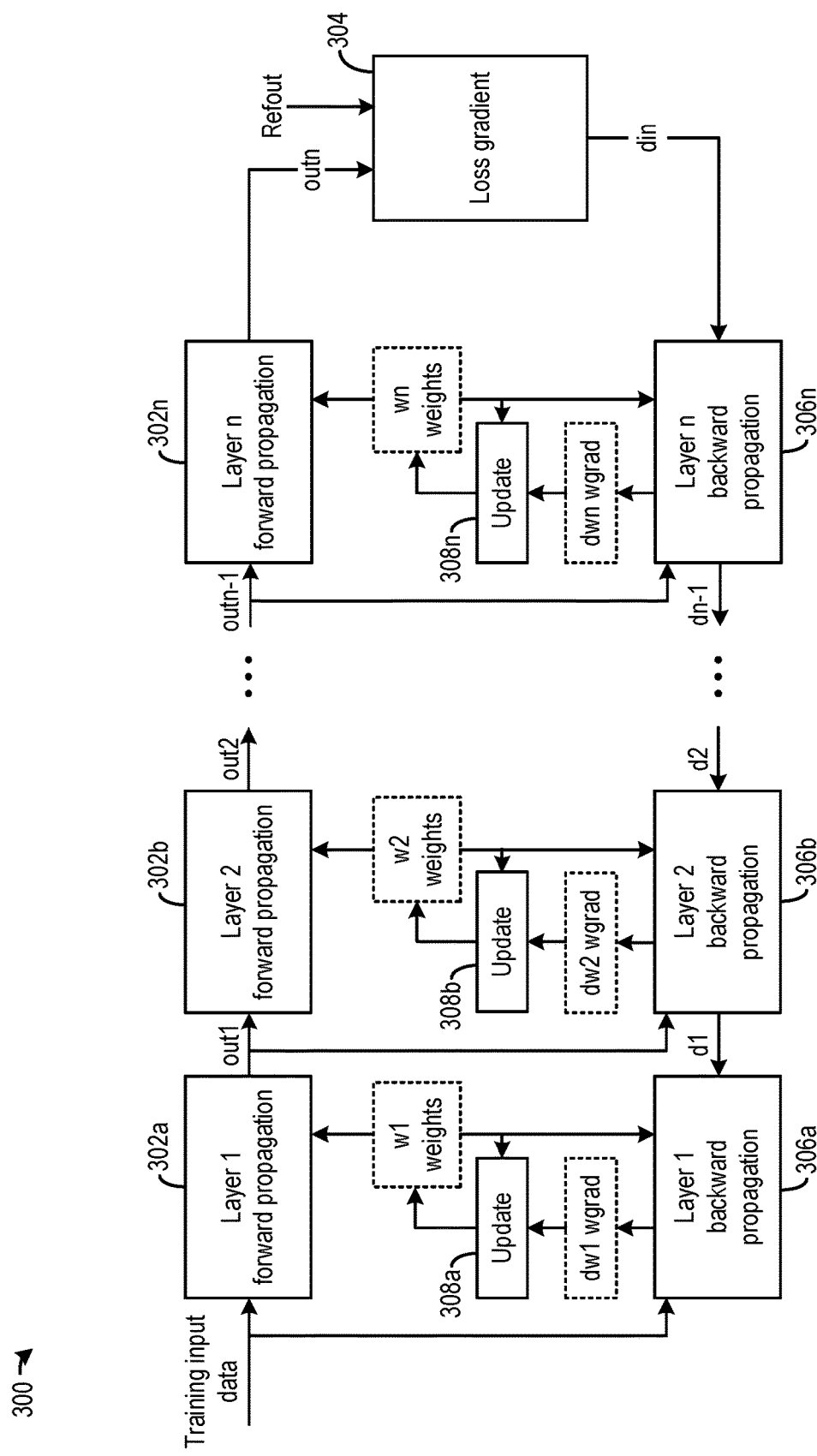
FIGS. 3A-3C illustrate examples of a training process of a neural network.

FIG. 3A illustrates an example of a training process 300 to train a neural network, including the neural network of prediction model 103. A training process can be performed by, for example, a neural network hardware accelerator that implements the neural network, a general purpose hardware processor, or other suitable computing systems that support the arithmetic operations involved in neural network processing as described above. The training can be based on a gradient descent scheme, which includes forward propagation operations, loss gradient operation, and backward propagation operations. Specifically, as shown in FIG. 3A, a forward propagation operation can be performed for each neural network layer, such as a forward propagation operation 302a for the lowest layer 1 (which can correspond to input layer 207 of FIG. 2A), a forward propagation operation 302a for layer 2 (which can correspond to layer 209 of FIG. 2A), a forward propagation operation 302n for the highest layer n (which can correspond to layer 211 of FIG. 2A), etc. A forward propagation operation at a neural network layer can include the multiplication and summation computations between input data and a set of weights for that layer, followed by activation function processing, as described above in Equations 1 and 2, to generate output data. The output data can then propagate to the next neural network layer as input to the forward propagation operation at that layer. For example, as shown in FIG. 3A, forward propagation operation 302a can combine training input data with W1 weights of layer 1 to generate output data out1, which propagate to layer 2 as input. Forward propagation operation 302b can combine data out1 with W2 weights of layer 2 to generate output data out2, which can then propagate to the next layer. At the highest layer n, forward propagation operation 302n receives data outn−1 from layer n−1 (not shown in FIG. 3A), combines them with Wn weights of layer n, and generates output data outn.

A loss gradient operation 304 can compare the output data outn of layer n against reference output data refoutn to generate input data gradients din. The input data gradients din can measure a rate of difference between outn and refoutn with respect to each data element of output data outn. In some examples, an objective of the training is to minimize the difference between outn and refoutn such that the input data gradients din become close to zero.

Following the generation of input data gradients din by loss gradient operation 304, a backward propagation operation 306 can be performed for each neural network layer. For example, a backward propagation operation 306n can be performed at highest layer n, a backward propagation operation 306b can be performed at layer 2, a backward propagation operation 306a can be performed at layer 1. A backward propagation operation at a neural network layer can be based on the weights of that neural network layer, the data gradient input to that neural network layer, as well as the input to the forward propagation operation of that layer. For example, for layer n, backward propagation operation 306n can receive, as inputs, weights wn, input data outn−1 (from forward propagation operation at neural network layer n−1), and input data gradient din. The backward propagation operation can perform multiplication and summation computations similar to those of Equation 1 on the input to generate output data gradients (dn−1, d2, d1, etc. in FIG. 3A) and weight gradients wgrad (dwn, dw2, dw1, etc. in FIG. 3A). The output data gradients can be forwarded to the next lower neural network layer as inputs to the backward propagation operation in that layer, whereas the weight gradients can represent changes to be applied to weights at a neural network layer. The weights at layer n can be updated by an update operation 308 (e.g., update operation 308n for layer n) based on the weight gradients dwn based on the following equation:

$$wn'=wn-\alpha \times dwn \qquad \text{(Equation 4)}$$

In Equation 4, wn' can refer to the updated weights wn, whereas $\alpha$ can include a set of pre-determined constants.

The output data gradients dn−1 generated by layer n can then propagate to the next lower neural network layer n−1 as input to the backward propagation operation at that layer. Backward propagation operation 302b of layer 2 can operate on data gradients d2, weights w2, and input data out1 to generate output data gradients d1 as well as weight gradients dw2. Weight gradients dw2 can be used by update operation 308b to update w2 weights based on Equation 4. Data gradients d1 can propagate to layer 1. Backward propagation operation 302a of layer 1 can operate on data gradients d2, weights w1, and training input data to generate weight gradients dw1. Weight gradients dw1 can be used by update operation 308a to update w1 weights based on Equation 4.

A training process typically involves supplying the neural network with multiple sets of training input data to cover different operation conditions, such that the neural network can be trained to provide a correct decision under those different operation conditions. Due to limited computation resources, the computing system (e.g., a neural network hardware accelerator) typically lacks the capability to use all the training input data sets at one time to perform the training. Instead, the training input data can be divided into multiple portions. The computing system can perform the training process sequentially in batches, with each batch to operate on a portion of the training input data.

Figure 3B:
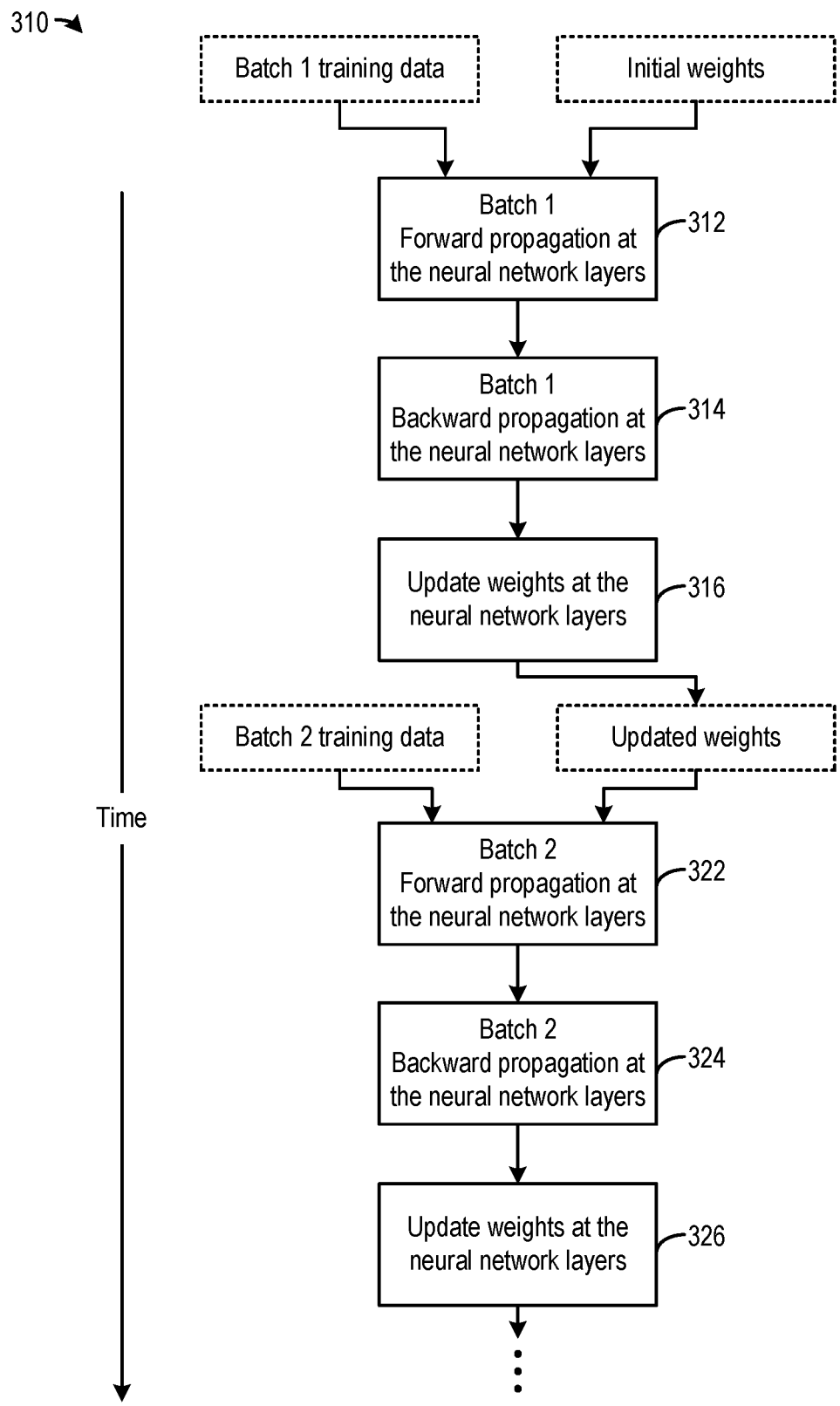

FIG. 3B illustrates an example 310 of batches of a training process with respect to time. As shown in FIG. 3B, batch 1 training operation can be performed, which comprises operations 312, 314, and 316. In operation 312, forward propagation operations can be performed at each neural network layer based on batch 1 training input data and initial weights. And then in operation 314, backward propagation operations can be performed at each neural network layer based on the outputs of operation 312, followed by operation 316 in which the weights at each neural network layer are updated based on the weight gradients from the backward propagation operations in operations 314. After the batch 1 training operation is complete, batch 2 training operations can be performed, which comprises operations 322, 324, and 326. Operation 322 includes forward propagation operations based on batch 2 training input data and the updated weights from batch 1 training operations, operation 324 includes backward propagation operations based on the outputs of operation 322, followed by operation 326 in which the weights at each neural network layer are further updated based on the weight gradients from the backward propagation operations in operations 324. Following the completion of batch 2, other batches of training operations can be performed on other portions of the training input data. The batches of training operations can also be repeated in multiple iterations until, for example, the input data gradients din from loss gradient operation 304 become close to zero, which indicates that the differences between training outputs outn and reference outputs refout are minimized.

As shown in FIG. 3B, a training process performed on a single computing system can be very time-consuming due to the sequential nature of the training process. Specifically, as described above, in a training process a forward propagation is first performed at each neural network layer to compute a training output data set, and then input data gradients are computed based on the training output data set (and reference output data set), and then a backward propagation is performed at each neural network layer to compute the weight gradients, which is then followed by the updating of the weights at each neural network layer. As the backward propagation operations depend on the forward propagation operations, the two sets of operations cannot be performed in parallel. This is evident in FIG. 3B, in which the backward propagation operations are performed after the forward propagation operations, and the weight update operations are performed after the backward propagation operations. Moreover, due to data dependency among the neural network layers, the forward propagation operations and the backward propagation operations also need to be performed sequentially for each neural network layer. The lack of parallelism can drastically increase the training time, which is further increased when multiple batches of the training process are performed for different portions of the training input data set, and the batches are repeated in multiple iterations to converge towards minimum data gradients.

Figure 3C:
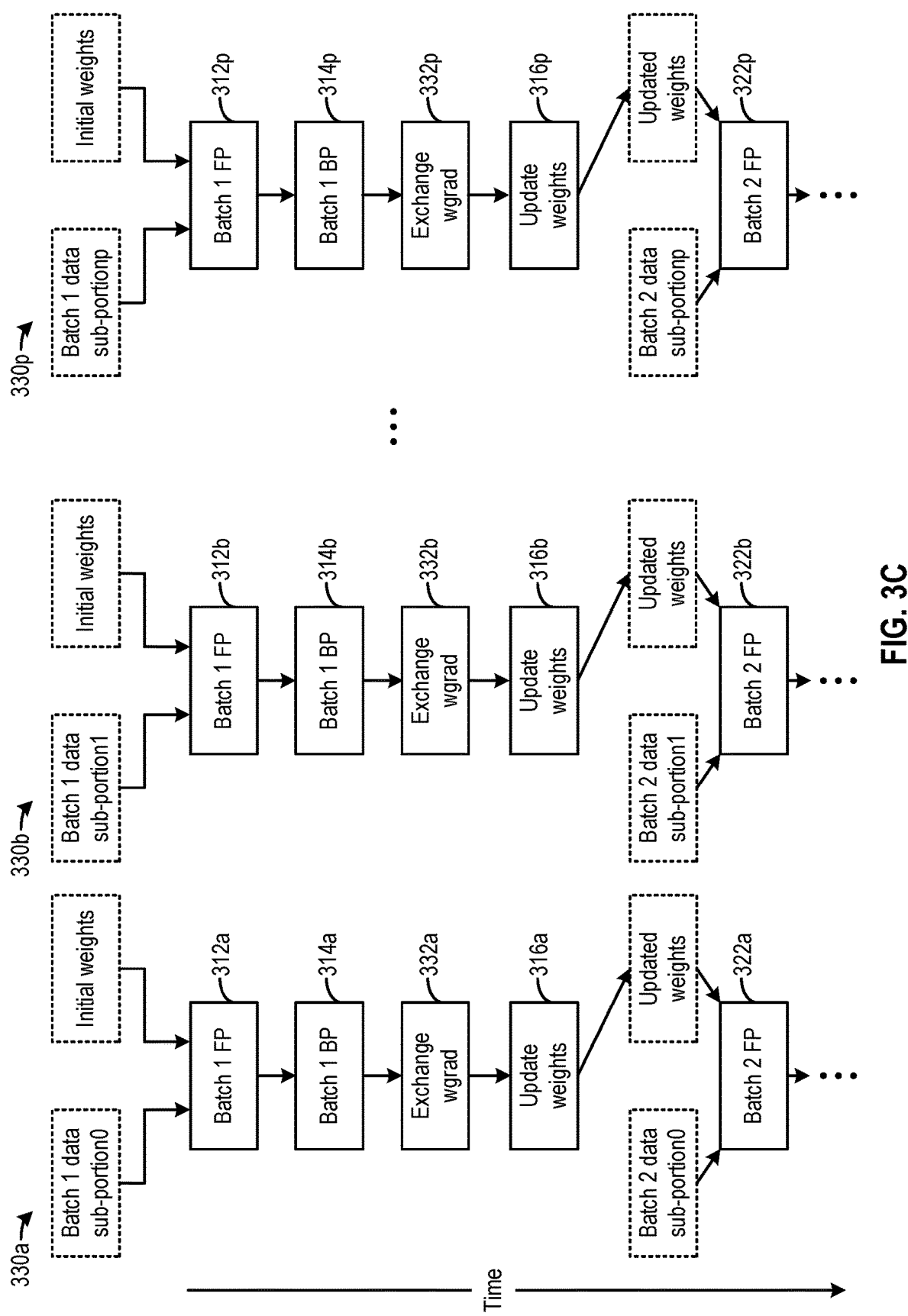

One way to accelerate a training process is by using a distributed system, to distribute the training process across multiple computing systems, each of which is configured as a worker node. Specifically, referring to the batch example of FIG. 3B above, each portion of training input data can be further subdivided into sub-portions, with each sub-portion to be processed in a parallel training process by each worker node of the distributed system. FIG. 3C illustrates an example of the parallel training processes in a distributed system. As shown in FIG. 3C, a portion of training input data for a batch training operation can be further subdivided into a sub-portion 0, a sub-portion 1, a sub-portion p, etc. A parallel training process (e.g., training processes 330a, 330b, 330p, etc.) can be performed at each worker node. For example, at around the same time, each worker node can perform operation 312 (e.g., 312a, 312b, 312p, etc.), which includes forward propagation operations, based on the respective sub-portion of training input data and the same set of initial weights. Following the completion of the forward propagation operations, each worker node can perform operation 314 (e.g., 314a, 314b, 314p, etc.), which includes backward propagation operations. Each worker node can perform its respective operation 314 at around the same time to generate weight gradients for each neural network layer. The weight gradients are generated by each worker node based on a respective sub-portion of the training input data received by the worker node.

Following the completion of the backward propagation operations, each worker node can perform an exchange operation 332 (e.g., 332a, 332b, 332p, etc.) to exchange the weight gradients generated at the each worker node with other worker nodes. Each exchange operation includes a worker node transmitting a set of weight gradients for each neural network layer to each of the other worker nodes, and receiving a set of weight gradients for each neural network from the each of the other worker nodes. The worker node can average its set of weight gradients and the sets of weight gradients received from other worker nodes. At the end of exchange operation 332, each worker node can have the same set of averaged weight gradients. Each worker node can then perform operation 316 (e.g., 316a, 316b, 316p, etc.) to update the weights for each neural network layer based on the averaged weight gradients, and then start batch 2 forward propagation operation 322 (e.g., 322a, 322b, 322p, etc.) in parallel based on the updated weights.

Distributing the training process across multiple worker nodes can reduce the amount of training data to be processed at each worker node, which can reduce the execution time of the forward and backward propagation operations and accelerate the training process. For example, as the volume of training data processed by each worker nodes has been reduced, the durations of the forward propagation operation 312 and backward propagation operation 314 in FIG. 3C can be shorter than the durations of the same operations in FIG. 3B. However, the exchange of the weight gradients among the worker nodes, in operations 332, can introduce a substantial bottleneck. For example, in a case where the distributed system is in a cloud infrastructure and each worker node exchange weight gradients with each other by sending network packets, the network latency can be substantial relative to the execution times of the forward/backward propagation operations. As a result, the duration of exchange weight gradients operations 332 can be much larger than that of the forward propagation operations 312 and backward propagation operations 314. As the weight gradients exchange operations 332 are serialized with forward propagation operations 312 and backward propagation operations 314, the weight gradients exchange operations 332 can add significant delay to the training process and increase the training time.

Figure 4A:
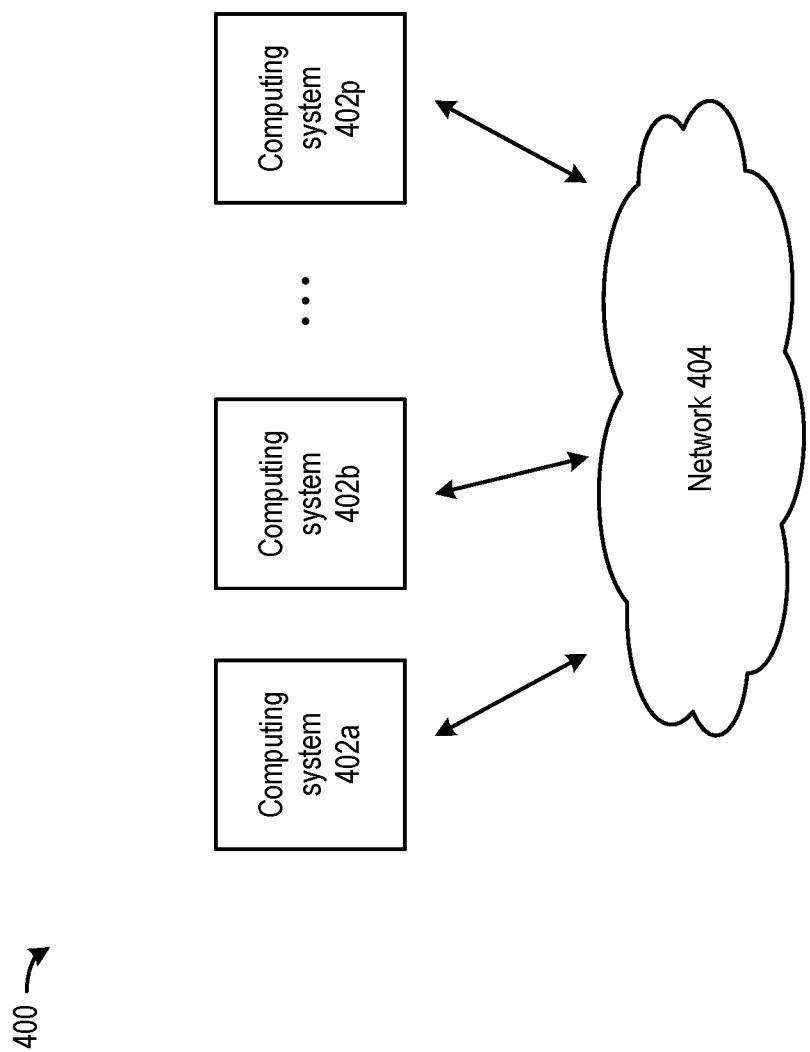
FIGS. 4A-4C illustrate examples of performing a training process of a neural network in a distributed system, according to certain aspects of the present disclosure.
Figure 4B:
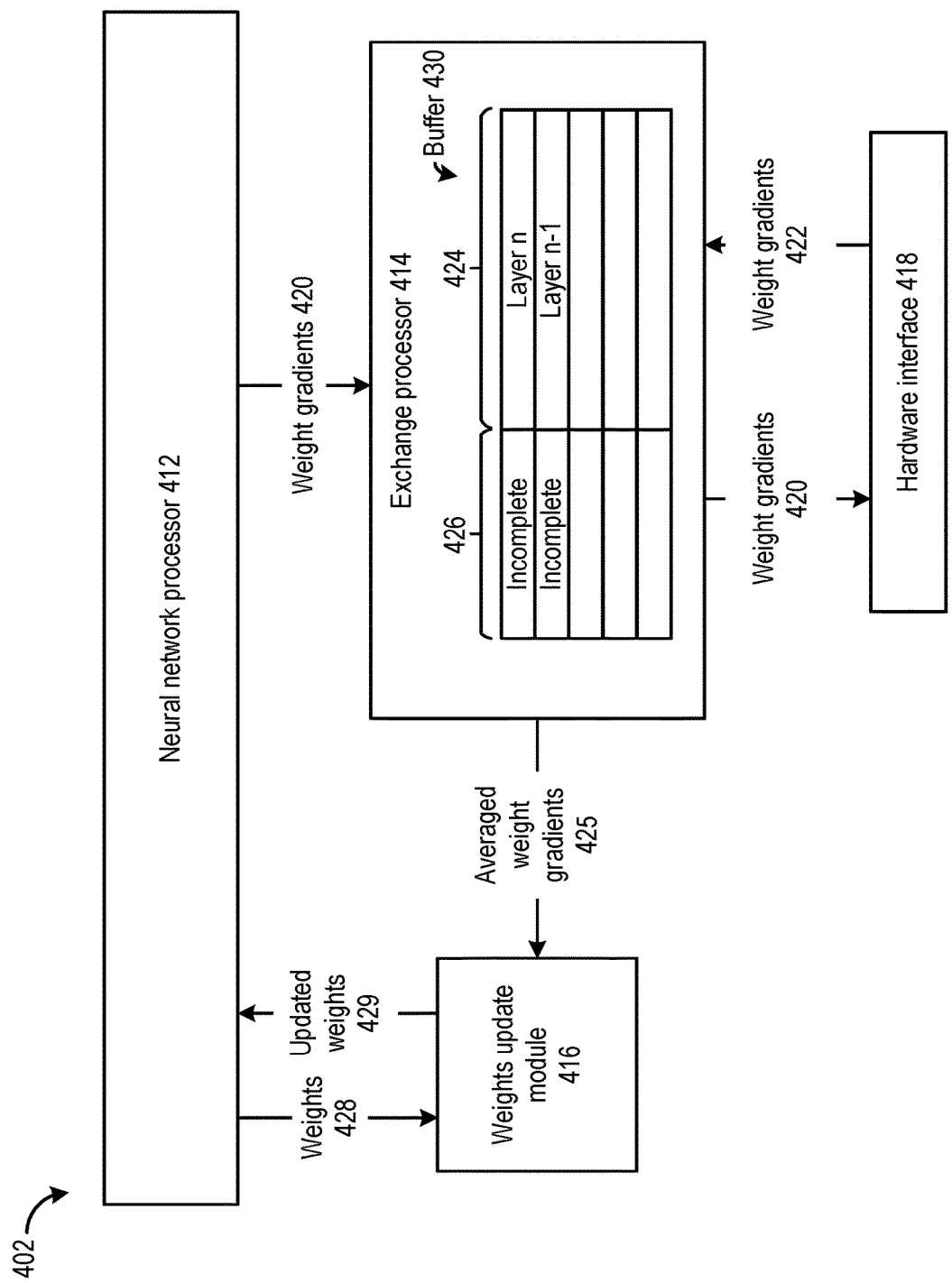
Figure 4C:
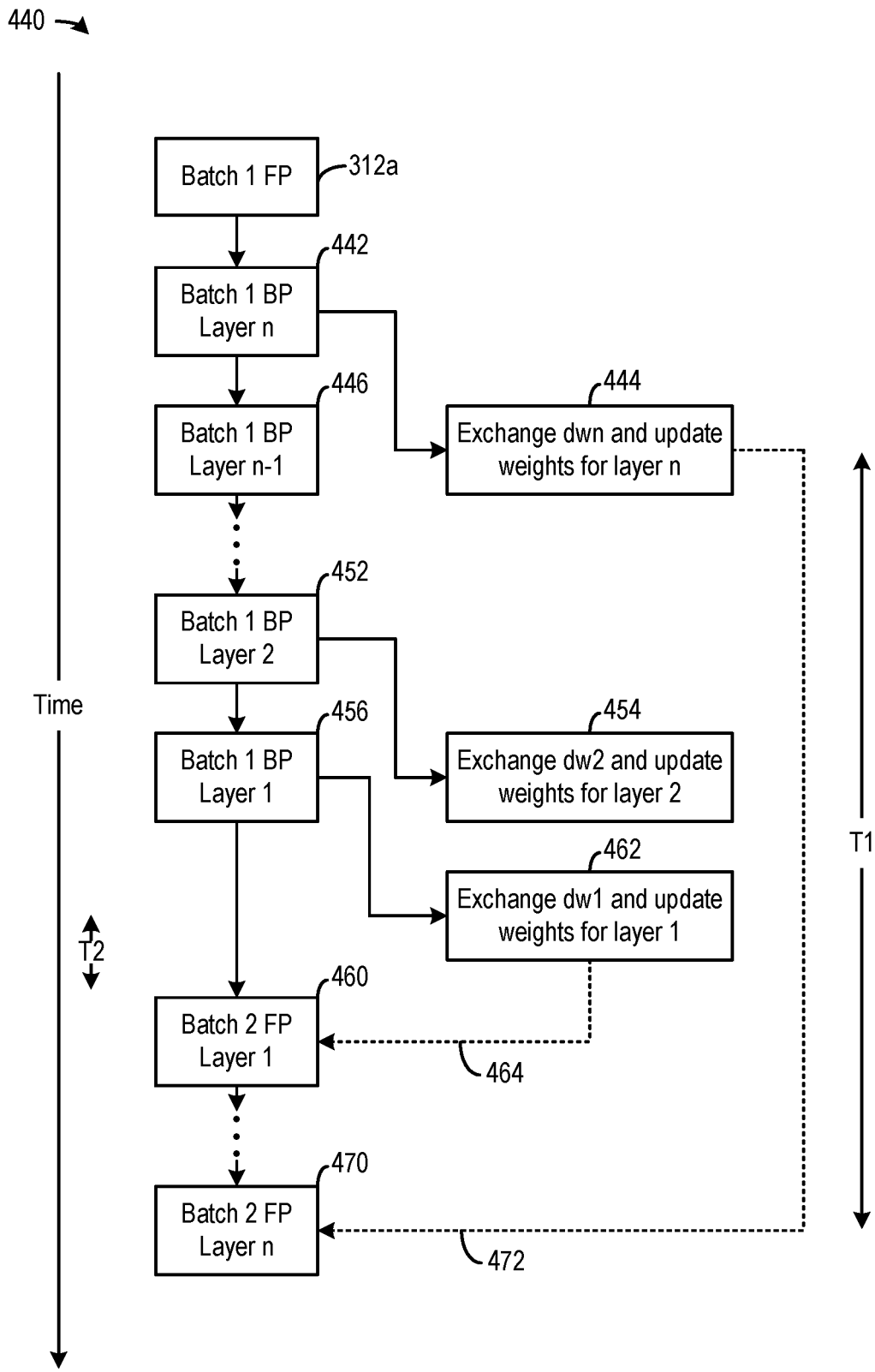

FIG. 4A, FIG. 4B, and FIG. 4C illustrate a distributed system 400 that can perform a training process for a neural network. As shown in FIG. 4A, distributed system 400 includes a plurality of computing systems 402a, 402b, 402p, etc. Each computing system can include a hardware interface to communicate with each other via network 404. Network 404 can be an Ethernet network, a point-to-point interconnect, a ring-based interconnect, etc. Each computing system can represent a worker node and include computing resources to perform the operations of a training process in FIGS. 3A-3C including forward propagation operations 312, backward propagation operations 314, update weights operations 316, etc. The computing resources may include, for example, a neural network hardware accelerator, a general purpose hardware processor, or other suitable computing systems that support the arithmetic operations involved in the training process. Each computing device can communicate, via network 404, with each other device to exchange weight gradients to perform exchange operations 332, and perform update weights operations 316 after exchange operations 332 are completed.

FIG. 4B illustrates an example of internal components of computing system 402. As shown in FIG. 4B, computing system 402 includes a neural network processor 412, an exchange processor 414, a weights update module 416, and a hardware interface 418. In some examples, exchange processor 414 and weights update module 416 can be implemented in software. In some examples, exchange processor 414 and weights update module 416 can also be implemented as hardware components, such as being part of an application specific integrated circuit (ASIC), a field programmable gate arrays (FPGA) device, etc. Computing system 402 further includes a controller (not shown in FIG. 4B) to coordinate the operations among neural network processor 412, exchange processor 414, weights update module 416, and hardware interface 418.

Neural network processor 412 can perform a forward propagation operation 312 for all neural network layers, followed by a backward propagation operation 314 for all neural network layers. After neural network processor 412 generates weight gradients for one neural network layer (e.g., weight gradients 420), it sends the weight gradients to exchange processor 414, which manages the exchange operation of the weight gradients. As part of the exchange operation, exchange processor 414 can forward the weight gradients to hardware interface 418 for transmission to other worker nodes via network 404. Exchange processor 414 can also receive other weight gradients from other worker nodes via network 404 and hardware interface 418. Exchange processor 414 can average weight gradients 420 and 422 to generate averaged weight gradients 425 for a neural network layer, and then transfer averaged weight gradients 425 to weights update module 416.

Weights update module 416 can perform weights update operations 316. Weights update module 416 can include software instructions and/or hardware circuits (e.g., arithmetic circuits) to update weights based on Equation 4 above. As part of weights update operations 316, weights update module 416 can receive weights 428 for that neural network layer from neural network processor 412 (or from other sources), update the weights based on the averaged weight gradients 425 from exchange processor 414 according to Equation 4 above, and send updated weights 429 to neural network processor 412 prior to the next batch of forward propagation operation 322.

Meanwhile, during the exchange of the weight gradients and updating of the weights, neural network processor 412 can start the backward propagation operation for the next (lower) neural network layer. Neural network processor 412 can then send another set of weight gradients for the next neural network layer to exchange processor 414 after the backward propagation operation for the next neural network layer is complete.

In some examples, exchange processor 414 may include a buffer 430 to store the weight gradients received from neural network processor 412 as an exchange task for a neural network layer. Buffer 430 can be implemented in a memory that is coupled with or is part of exchange processor 414. Buffer 430 can include multiple entries. Each entry can store an exchange task 424 including the weight gradients of a neural network layer, and an indication 426 of complete/incomplete of the execution of the exchange task. As shown in FIG. 4B, buffer 430 can store, for example, an exchange task for layer n, an exchange task for layer n−1, etc. Exchange processor 414 can execute an exchange task by releasing the weight gradients of the exchange task to hardware interface 418 whenever hardware interface 418 is available (e.g., not sending other data packets). In some examples, exchange processor 414 can execute the exchange tasks in the order it stores the tasks in buffer 430, such that buffer 430 is operated as a first-in-first-out buffer. In some examples, as to be described below, exchange processor 414 can execute the exchange tasks based on prioritizing lower neural network layers, so that at least some of the exchange tasks are executed out of order from which the tasks are stored in buffer 430.

To perform an exchange task, hardware interface 418 can establish a communication channel with each of the other worker nodes, exchange weight gradients with each of the other worker nodes using the communication channels, and forward the received weight gradients back to exchange processor 414. When exchange processor 414 detects that all the weight gradients for a neural network layer have been received, exchange processor 414 can determine that the exchange task for that neural network layer is complete, and forward a full set of weight gradients to weights update module 416 to perform weights update operation 316a as described above.

The arrangements of FIG. 4B allow the exchange of weight gradients to be performed in parallel with the backward propagation operations. FIG. 4C illustrates an example of a training process 440. As shown in FIG. 4C, after backward propagation operation 442 for layer n is complete, operation 444, which includes the exchange of weight gradients for layer n (dwn) and updating of the weights for layer n, can be performed in parallel with backward propagation operation 446 for layer n−1. Likewise, after backward propagation operation 452 for layer 2 is complete, operation 454, which includes the exchange of weight gradients for layer 2 (dw2) and updating of the weights for layer 2, can be performed in parallel with backward propagation operation 456 for layer 1. Compared with FIG. 3C where the exchange of weight gradients is serialized with the backward propagation operations, the arrangements of FIG. 4B can substantially reduce the training time and can further accelerate the training process. Moreover, the parallelism does not affect the weights update operation for the higher neural network layer (e.g., layer n) nor the backward propagation operation for the lower neural network layer (e.g., layer n−1) as the two operations have no data dependency between each other.

Although the arrangements of FIG. 4B can accelerate the training process, the training time can be further reduced by prioritizing the exchange of weight gradients for lower layers. For example, the exchange of at least some of weight gradients of the lowest layer 1 (dw1) can be performed first, followed by the exchange of weight gradients of other layers, including layers 2 and n. Prioritizing the exchange of weight gradients for lower layers over higher layers can shorten the training time. Moreover, the second batch forward propagation operation of layer 1 (operation 460) depends on the exchange of weight gradients dw1 and the updating operation 462 of the weights of layer 1 in the prior first batch backward propagation operation of layer 1, as shown by data dependency arrow 464. Therefore, the updating operation 462 of layer 1 must serialize with second batch forward propagation operation 460 of layer 1. As such, the time it takes for operation 462 to complete can determine a wait time between the first batch training process and the second batch training process and can contribute significantly to the overall training time. Prioritizing the exchange of weight gradients and updating of weight operation 462 for layer 1 can reduce the likelihood of putting operation 462 on hold while waiting for the exchange of weight gradients of other layers to complete, which can further delay the completion of operation 462 and the start of the second batch training process. Specifically, operation 462 can start as soon as the batch 1 backward operation 456 for layer 1 is complete. Therefore the time it takes for operation 462 to complete can be reduced, which can further reduce the overall training time.

Meanwhile, delaying the exchange of weight gradients for higher level does not necessarily increase the overall training time. This is due to the higher layers having a larger timing window to perform the exchange of weight gradients and the updating of the weights before the updated weights are needed in the next batch forward propagation operation for the higher layers. This is due to the forward and backward propagation operations being performed in opposite orders among the neural network layer. As described above, the backward propagation operations start at the highest neural network layer and end at the lowest neural network layer. After the weights are updated, a new iteration of the training process can start, in which the forward propagation operations start at the lowest neural network layer and end at the highest neural network layer. As the lowest neural network layer is the last layer to generate the weight gradients but is also the first layer to use the updated weights in the forward propagation operation for the next iteration of the training process, the timing window provided to the lowest neural network layer for the exchange of weight gradients and the subsequent updating of the weights is the shortest among all the neural network layers. As shown in FIG. 4C, while layer n has a window of T1 to complete the weight gradients exchange and weights update before batch 2 forward operation 470 for layer n needs the updated weights, as indicated by data dependency arrow 472, layer 1 has a much shorter window of T2 to complete the weight gradients exchange and weights update. The exchange of weight gradients of the higher layers can be delayed such that they are performed in parallel with the batch 2 forward propagation operations of the lower layers (which have no data dependency on the updated weights of the higher layers), to further reduce the training time.

Figure 5A:
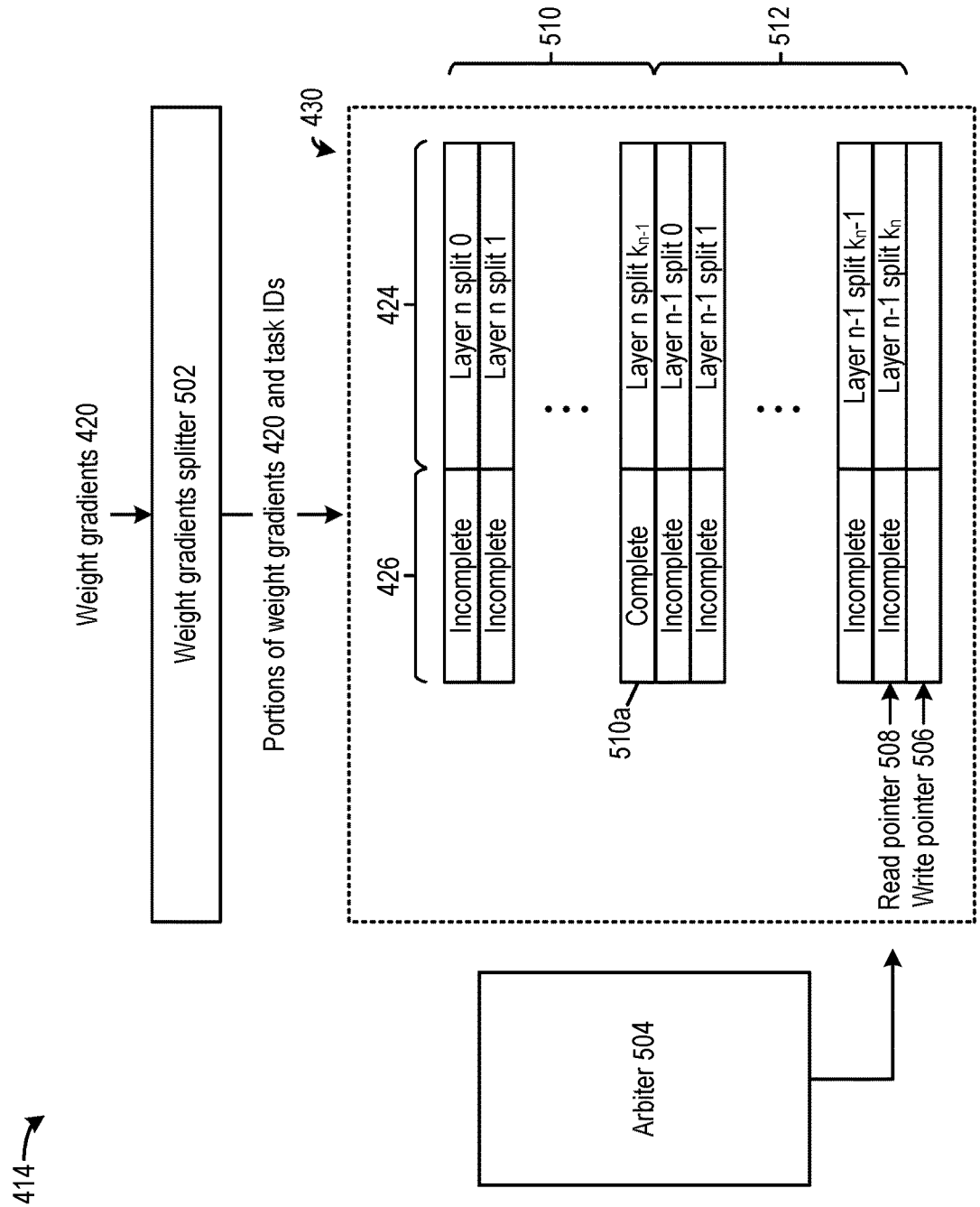
FIGS. 5A-5E illustrate examples of components of a computing system to support the example training processes of FIGS. 4A-4C.

FIG. 5A illustrates additional components of exchange processor 414 that can support prioritization of exchange tasks of lower neural network layers. Specifically, the weight gradients to be exchanged for each layer can be split into portions, with each portion associated with an exchange task. The execution of the exchange tasks for a higher neural network layer can be suspended when new exchange tasks for a lower neural network layer are generated to allow the execution of the new exchange tasks. As the lower neural network layer has a shorter window to complete the weight gradients exchange and weights update, such arrangements can ensure that the weight gradients exchange and weight update operations of the lower neural network layer start as soon as possible after the weight gradients are generated. As a result, the delay introduced to the training operation by putting the next batch forward propagation computations of the lower neural network on hold while waiting for the completion of the weight gradients exchange can be reduced.

Referring to FIG. 5A, in addition to buffer 430, exchange processor 414 further includes a weight gradients splitter 502 and an arbiter 504, which can be controlled by a controller (not shown in FIG. 5A). Weight gradients splitter 502 can split weight gradients for a neural network layer, provided by neural network processor 412, into a plurality of equal portions, and each portion can be associated with an exchange task. As to be described below, the size of a portion of the weight gradients included in an exchange task can be based on various factors including, for example, a predetermined threshold level of network efficiency in transmitting the weight gradients, a target time of completion of the training process, etc. In addition, arbiter 504 can control the order of execution of the exchange tasks stored in buffer 430. Buffer 430 is further associated with a write pointer 506 and a read pointer 508. Write pointer 506 can point to an empty entry to store the next new exchange task and can be adjusted for each newly stored exchange task. Read pointer 508 indicates the entry that stores the execution task being executed. As to be described below, arbiter 504 can control read pointer 508 to prioritize exchange tasks of lower neural network layers and/or to prioritize newly-stored exchange tasks.

Referring to FIG. 5A, neural network processor 412 completes the backward propagation operation of a neural network layer (e.g., layer n) and provides weight gradients (e.g., weight gradients 420) to weight gradients splitter 502. Weight gradients splitter 502 may include an internal buffer (not shown in FIG. 5A) to store the weight gradients. Based on configuration information that specifies a number of weight gradients to be included in each portion, weight gradients splitter 502 can retrieve portions of weight gradients 420 from the internal buffer, and send the portions of weight gradients 420 as well as exchange task identifiers associated with the portions to buffer 430. Buffer 430 can store each portion of weight gradients 420, identified based on the associated exchange task identifier, as an exchange task, and a first plurality of exchange tasks 510 can be stored in buffer 430.

As an illustrative example, for layer n, weight gradients splitter 502 can split the weight gradients into portions 0 to $k_n$, whereas for layer n−1, weight gradients splitter 502 can split the weight gradients into portions 0 to $k_{n-1}$. One exchange task can be stored into an entry of buffer 430 at a time, with write pointer 506 adjusted to point to the next entry to store the next exchange task. After the first plurality of exchange tasks is stored in buffer 430, arbiter 504 can start executing the first plurality of exchange tasks from buffer 430 based on detecting that hardware interface 418 is idle. Arbiter 504 can set read pointer 508 to the most recently stored execution task, and then execute the tasks in a reverse order by which the tasks are stored in buffer 430, until buffer 430 stores a second plurality of exchange tasks 512 for a different set of weight gradients from a different neural network layer (e.g., layer n−1).

When buffer 430 stores the second plurality of exchange tasks 512, arbiter 504 can determine whether the second plurality of exchange tasks are for a lower neural network layer than the layer associated with first plurality of exchange tasks 510. In the example of FIG. 5A, arbiter 504 can determine that they are. Arbiter 504 can then wait until the exchange tasks of first plurality of exchange tasks 510 that are in progress have been completed. When those exchange tasks complete (e.g., task 510a for layer n split $k_n$), arbiter 504 can suspend the execution of the rest of the first plurality of exchange tasks, set the read pointer to the last one of the second plurality of exchange tasks, and start executing the second plurality of exchange tasks, hence giving higher priority to the second plurality of exchange tasks. After the second plurality of exchange tasks is complete, the remaining first plurality of exchange tasks can be executed in parallel with the forward propagation operations of the lower layer (layer n−1).

The higher priority given to the second plurality of exchange tasks can be based on, for example, the second plurality of exchange tasks being generated for a lower neural network layer than the first plurality of exchange tasks, and/or the second plurality of exchange tasks being stored in buffer 430 later than the first plurality of exchange tasks. Just as the first plurality of exchange tasks, the second plurality of exchange tasks can also be executed in a reverse order by which the tasks are stored in buffer 430, followed by the first plurality of exchange tasks and skipping all the exchange tasks that have been completed, until buffer 430 stores a third plurality of exchange tasks for another set of weight gradients from yet another different neural network layer. With the arrangements of FIG. 5A, the exchange tasks of lower neural network layers can be prioritized over the exchange tasks of higher neural network layers, which can reduce the training time as described above.

The size of a portion of the weight gradients included in an exchange task is determined based on dividing the total number of weight gradients to be transmitted by a worker node and the number of exchange tasks to be performed to exchange the weight gradients. The number of exchange tasks (and the number of weight gradients in a portion associated with an exchange task) can be determined based on various factors to minimize the overall training time.

In one example, to minimize or at least reduce the overall training time, a threshold level of network efficiency in transmitting the weight gradients can be determined such that the exchange tasks can be completed in a network having a certain network bandwidth within a target period of time, and the entire training process can be completed within a target training time. Specifically, each exchange task includes establishing a communication channel between worker nodes and preparing data for transmission over the network as well as the exchange of the weight gradients via the communication channel. The establishment of the communication channel and preparation of data for transmission incur overhead time. Increasing the number of exchange tasks can lead to the accumulation of overhead time, which can reduce the share of the time the network spent in transmitting the weight gradients, and the share of the time can define the network efficiency in transmitting the weight gradients. The number of exchange tasks can be determined such that the share of time of transmitting the weight gradients, as compared with the share of the overtime, satisfies a predetermined threshold level of network efficiency.

The splitting of the weight gradients into portions and assigning the portions to different exchange tasks can also improve the utilization of hardware interface 418 and network 404 while reducing the delay to the lower layer exchange tasks due to the prioritization. Specifically, by splitting the weight gradients into portions and assigning the portions to different exchange tasks, at least some of the higher layer weight gradients can be exchanged in parallel with the backward propagation operations of the lower layer. Compared with an arrangement where all of the exchange tasks of higher layers are held up until the exchange task of the lowest layer is complete, the arrangements of FIG. 5A can reduce the likelihood of hardware interface 418 and network 404 sitting idle to wait for the exchange task of the lowest layer, which can improve the utilization of hardware resources and maintain the efficiency of the network between the worker nodes. Moreover, since at least some of the exchange tasks of the higher layers can be executed first rather than all of them being held up to wait for the exchange task of the lowest layer to complete, the likelihood of the exchange tasks of the higher layers becoming a bottleneck due to the prioritizing can also be reduced.

Figure 5B:
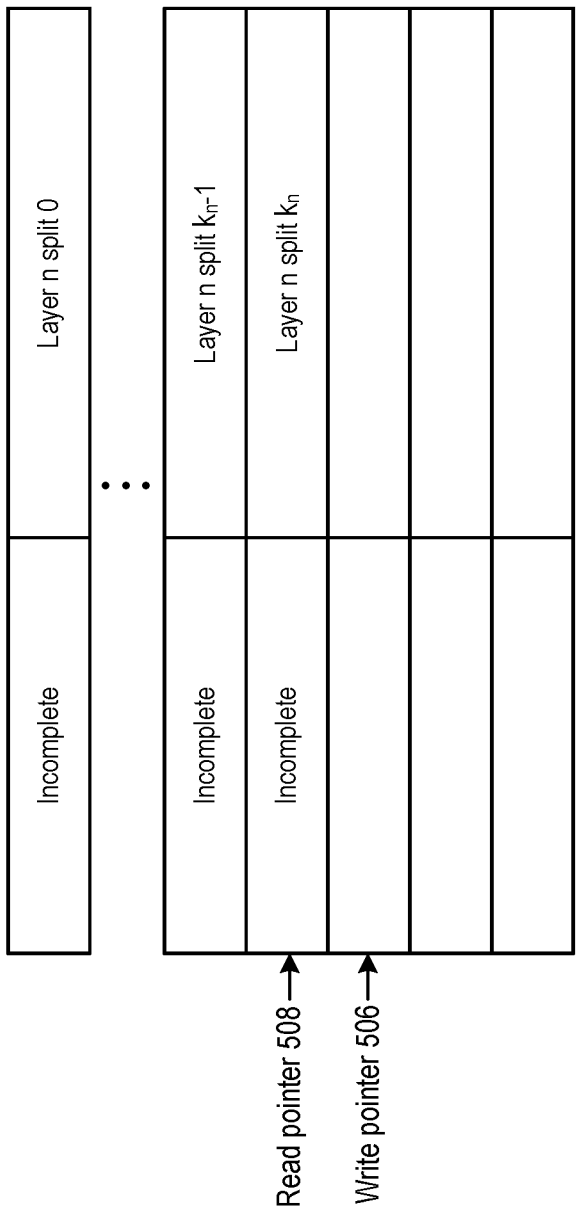

FIG. 5B to FIG. 5E illustrate example states of buffer 430 at different stages of a training process. FIG. 5B indicates a state of buffer 430 at the end of a backward propagation operation of layer n. The weight gradients are split into portions 0 to k, each portion being associated with an exchange task, and the exchange tasks are stored sequentially from portion 0 to portion k. Write pointer 506 can point to the first empty entry after the exchange task for layer n portion k ("layer n split $k_n$"), whereas read pointer 508 can point to the entry that stores the exchange task for layer n portion $k_n$ (one entry above write pointer 506), of which the execution is in progress. The next exchange task to be executed can be layer n portion k−1 ("layer n split $k_n-1$") based on the reverse order by which the tasks are stored in buffer 430.

Figure 5C:
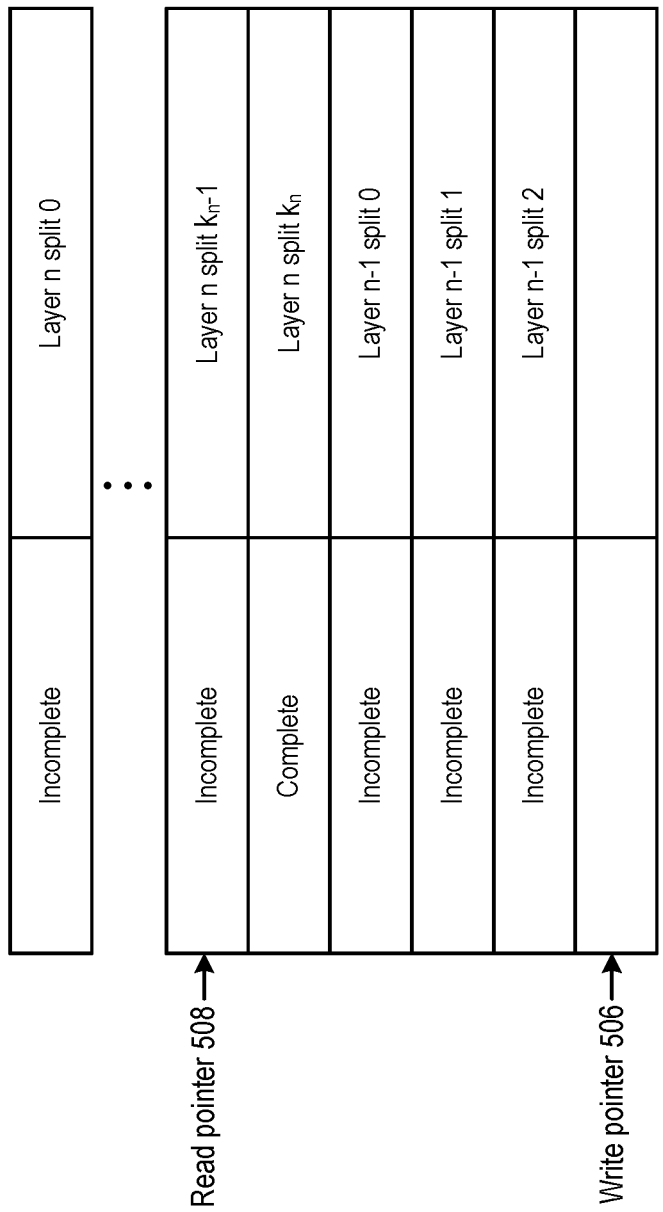

FIG. 5C illustrates a state of buffer 430 at the end of a backward propagation operation of layer n−1. The weight gradients are split into portions 0 to 2, each portion being associated with an exchange task, and the exchange tasks are stored sequentially from portion 0 to portion 2. Write pointer 506 can point to the first empty entry after the exchange task for layer n−1 portion 2 ("layer n−1 split 2"). At the time when the exchange tasks for layer n−1 are stored, the execution of layer n split k is complete, while the execution of layer n split $k_{n-1}-1$ is in progress. Arbiter 504 can wait till the execution of layer n split $k_{n-1}-1$ is complete and then suspend the execution of the rest of the exchange tasks for layer n, and move read pointer 508 to layer n−1 split 2 to execute it next.

Figure 5D:
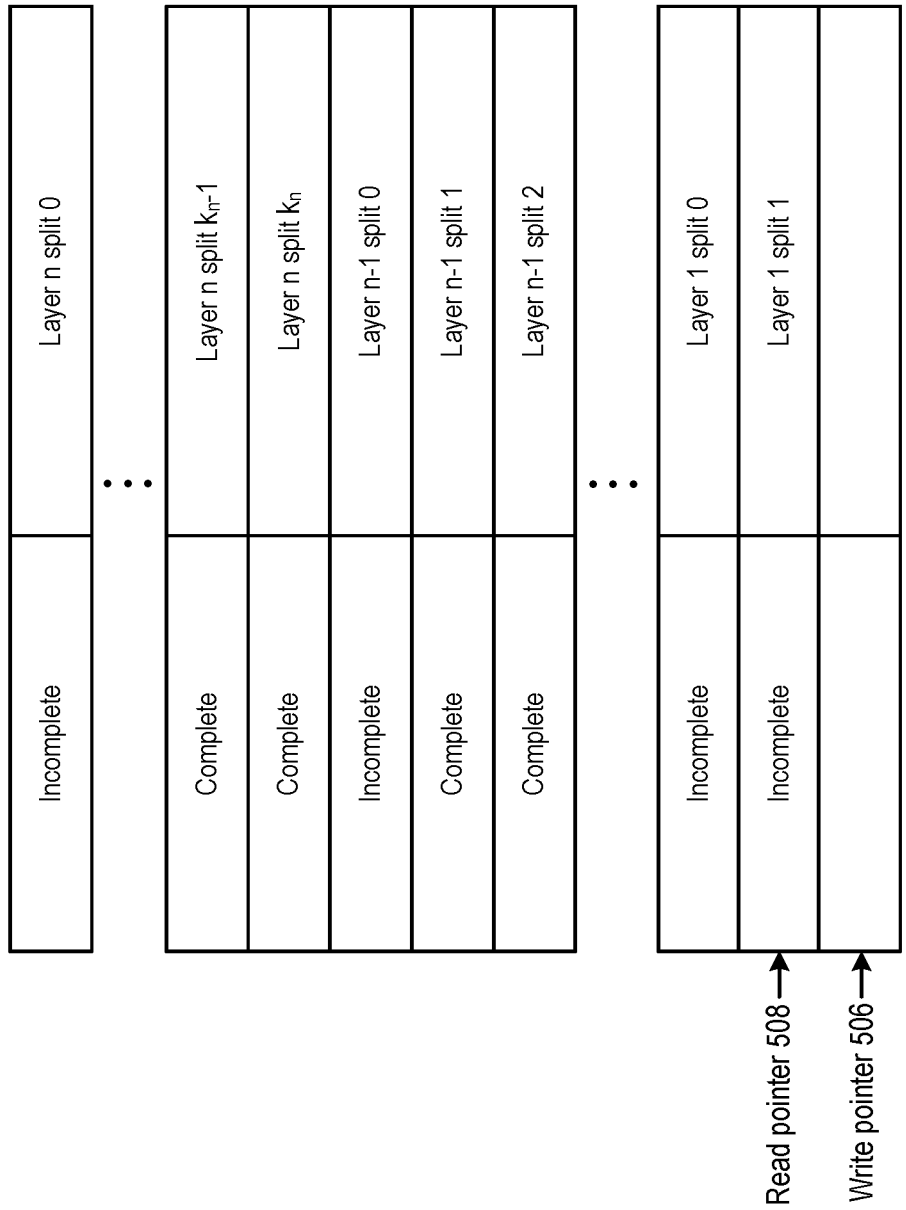

FIG. 5D illustrates a state of buffer 430 at the end of a backward propagation operation of layer 1 (the lowest layer). The weight gradients are split into portions 0 to 1, each portion being associated with an exchange task, and the exchange tasks are stored sequentially from portion 0 to portion 1. Write pointer 506 can point to the first empty entry after the exchange task for layer 1 portion 1 ("layer 1 split 1"). At the time when the exchange tasks for layer 1 are stored, the executions of layer n split k, layer n split k−1, layer n−1 split 2, as well as layer n−1 split 1 have completed. The executions of these exchange tasks can be in parallel with the backward propagation operations of higher layers, as explained above. Arbiter 504 can move read pointer 508 to layer 1 portion 1 of which the execution is in progress.

Figure 5E:
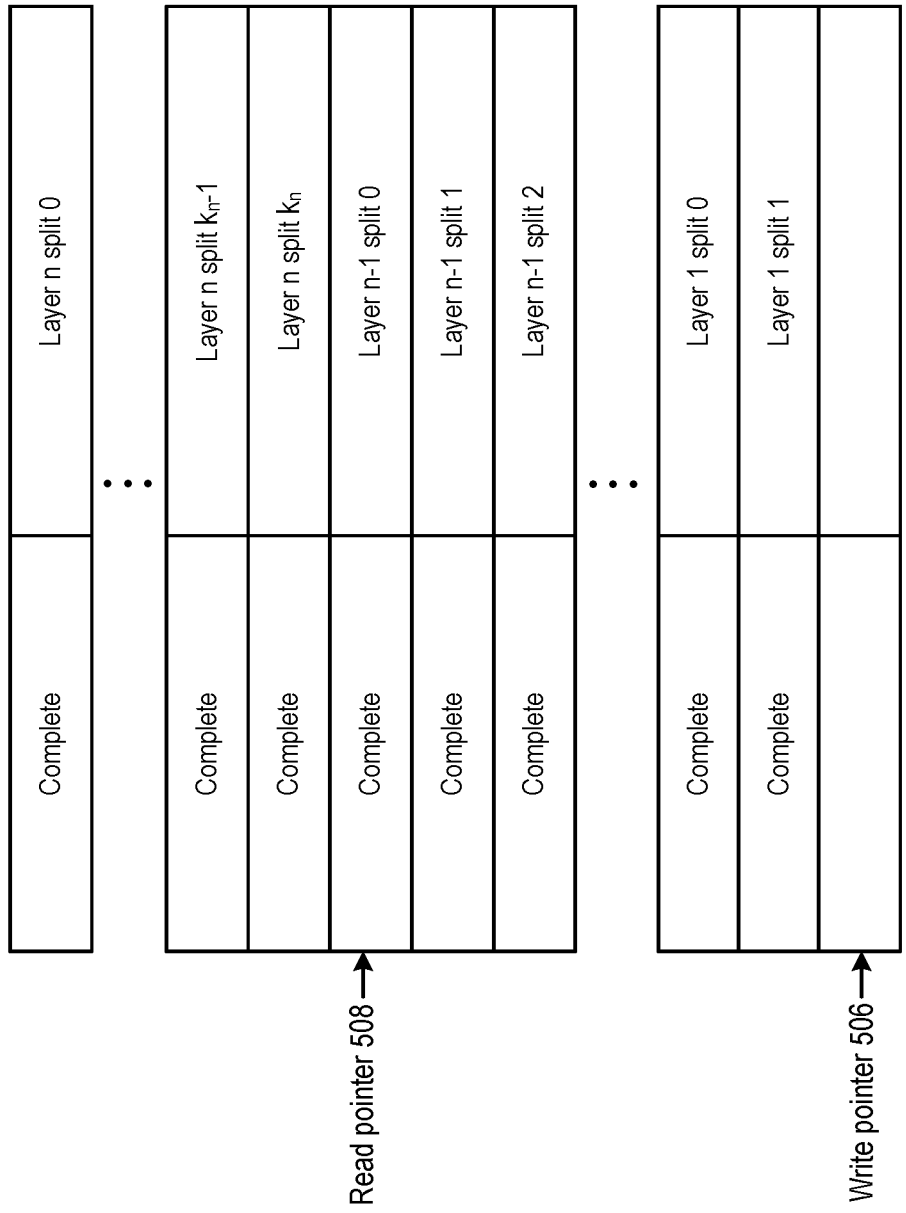

FIG. 5E illustrates a state of buffer 430 at the end of the next batch forward propagation operation of layer 1. As shown in FIG. 5E, the executions of exchange tasks layer 1 split 0 and layer 1 split 1 have completed, and weight update module 416 has the full set of weight gradients for layer 1 to update the weights for layer 1. Weights update module 416 can provide the updated weights for layer 1 to neural network processor 412, which can then perform the next batch forward propagation operation of layer 1. Meanwhile, arbiter 504 can move read pointer 508 to traverse through the remaining incomplete exchange tasks following the reverse order by which the tasks are stored, while skipping the completed exchange tasks. In FIG. 5E, arbiter 504 can move read pointer 508 to the entry that stores layer n−1 split 0 of which the execution is in progress.

FIG. 5E illustrates a state of buffer 430 where all the exchange tasks have been completed. Arbiter 504 can reset buffer 430 to prepare for the next batch or iteration of backward propagation operations.

Figure 6:
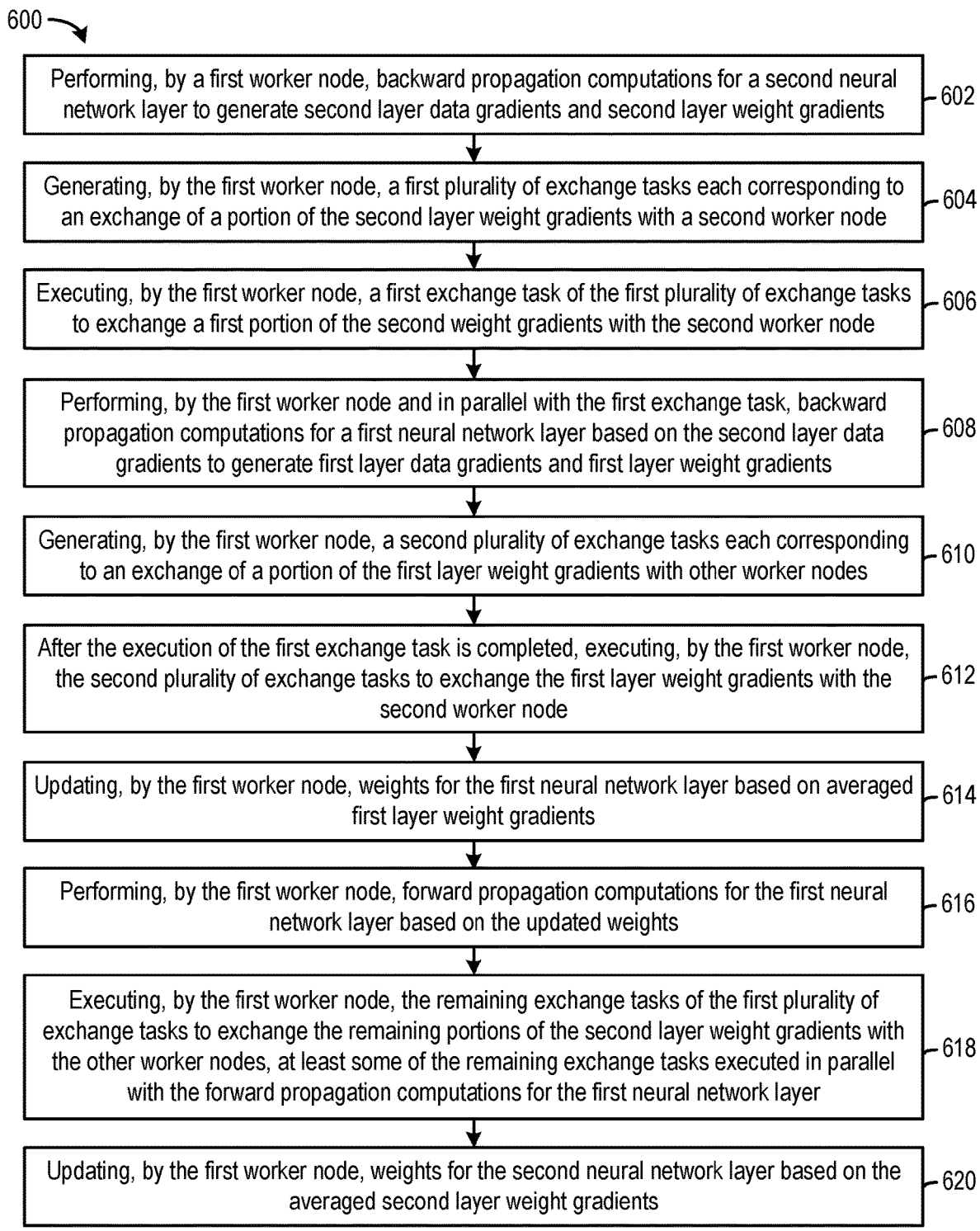
FIG. 6 illustrates an example method of performing a training process of a neural network in a distributed system, according to certain aspects of the present disclosure.

FIG. 6 illustrates a method of training a neural network in a distributed system, such as distributed system 400. Distributed system 400 includes a plurality of computing systems configured as worker nodes connected over network 404. The training process can be performed on a set of input data. The set of input data can be divided into a plurality of portions. Each portion is then divided into sub-portions. Each worker node can perform the training process a sub-portion of the input data in a first batch, followed by another sub-portion in a second batch, until all sub-portions of the input data have been used. Each batch of the training process can be performed by neural network hardware and can include forward propagation operations for each layer followed by backward propagation operations for each layer. In the example of FIG. 6, the neural network may include multiple neural network layers including a first neural network layer and a second neural network layer. The second neural network layer receives the output of the first neural network as input.

Method 600 starts in step 602, in which the neural network processor of a first worker node of distributed system 400 performs backward propagation computations for the second neural network layer to generate second layer data gradients and second layer weight gradients. The backward propagation computations can be of a first batch. Step 602 can be performed after the first batch forward propagation operations of both the first neural network layer and the second neural network layer have been completed, and input data gradients (din of FIG. 3A) has been generated. The first batch backward propagation computations can be performed based on either the input data gradients, or data gradients output by a higher neural network layer (if the neural network has more than two neural network layers).

In step 604, the first worker node generates a first plurality of exchange tasks each corresponding to an exchange of a portion of the second layer weight gradients with other worker nodes over network 404. Specifically, weight gradients splitter 502 can divide the second layer weight gradients into a plurality of portions, with each portion including a pre-determined number of second layer weight gradients. Each of the first plurality of exchange tasks may include the worker node establishing a communication channel with each of the other worker nodes, as well as transmitting a portion of the second layer weight gradients to each of the other worker nodes and receiving a portion of the second layer weight gradients generated at each of the other worker nodes via the communication channels. The size of a portion of the weight gradients included in an exchange task is determined based on dividing the total number of weight gradients to be transmitted by a worker node and the number of exchange tasks to be performed to exchange the weight gradients. The number of exchange tasks (and the number of weight gradients in a portion associated with an exchange task) can be determined based on various factors to minimize the overall training time, such as based on maintaining a certain degree of network efficiency in transmitting the weight gradients.

In some examples, weight gradients splitter 502 includes an internal buffer to store the weight gradients. Based on configuration information indicating a number of weight gradients to be included for each exchange task, weight gradients splitter 502 can obtain the number of second layer weight gradients from the internal buffer to form a portion for an exchange task and provide the second layer weight gradients and an execution task identifier to exchange processor 414. Exchange processor 414 can identify each portion of the second layer weight gradients based on the execution task identifier and store the portion in an entry of buffer 430. Exchange processor 414 can store the plurality of portions of second layer weight gradients associated with the first plurality of exchange tasks sequentially in a plurality of entries of buffer 430. Exchange processor 414 can maintain a read pointer (e.g., read pointer 508) and a write pointer (e.g., write pointer 506) to keep track of the storing of the exchange tasks. Read pointer 508 can point to the entry having the most recently stored execution task, while write pointer 506 can point to the next entry after read pointer 508 to receive the next exchange task.

In step 606, the first worker node executes a first exchange task of the first plurality of exchange tasks to exchange a first portion of the second weight gradients with the second worker node. The first worker node can obtain the first portion of the second weight gradients from a first entry of buffer 430. The first entry can be the entry pointed to by read pointer 508. To execute the first exchange task, the exchange processor 414 can control hardware interface 418 to establish a communication channel with each of the other worker nodes and transmit the first portion of the second weight gradients to the other worker nodes via the communication channel. Hardware interface 418 can also receive a same number of second weight gradients as the first portion from each of the other worker nodes as part of the first exchange task.

In step 608, the neural network processor of the first worker node performs, in parallel with the first exchange task, backward propagation computations for the first neural network layer based on the second layer data gradients (from step 602) to generate first layer data gradients and first layer weight gradients. The backward propagation computations for the first neural network layer is of the same batch (e.g., the first batch) as the backward propagation computations for the second neural network layer of step 602.

In step 610, the first worker node generates a second plurality of exchange tasks each corresponding to an exchange of a portion of the first layer weight gradients with the other worker nodes. Weight gradients splitter 502 can divide the first layer weight gradients into a plurality of portions, with each portion including a pre-determined number of first layer weight gradients and associated with an exchange task. The number of first layer weight gradients included in each of the second plurality of exchange tasks may be the same or different from the number of second layer weight gradients included in each of the first plurality of exchange tasks. As in step 604, each of the second plurality of exchange tasks may include the worker node establishing a communication channel with each of the other worker nodes, as well as transmitting a portion of the first layer weight gradients to each of the other worker nodes and receiving a portion of the first layer weight gradients generated at each of the other worker nodes via the communication channels.

In step 612, after the execution of the first exchange task is completed, the first worker node executes the second plurality of exchange tasks to exchange the first layer weight gradients with the second worker node. Specifically, exchange processor 414 can execute the exchange tasks based on the order by which the tasks are stored in buffer 430, but can prioritize the execution of the exchange tasks of the lower layers over the higher layers as soon as the exchange tasks of the lower layers are stored in buffer 430. For example, after the completion of the first exchange task (to exchange the first portion of the second layer weight gradients), exchange processor 414 can move read pointer 508 to the entry having the most recently stored exchange task among the second plurality of exchange tasks (for the first layer weight gradients) to execute that exchange task. Exchange processor 414 can then traverse the entries that store the rest of the second plurality of exchange tasks to complete the exchange of the first layer weight gradients. After the exchange of the first layer weight gradients is completed, exchange processor 414 can determine averaged first layer weight gradients based on averaging the first layer weight gradients generated by the first worker node and the first layer weight gradients received from other worker nodes.

In step 614, after the exchange of the first layer weight gradients is completed, weights update module 416 of the first worker node updates the weights for the first neural network layer based on the averaged first layer weight gradients. The updating can be based on Equation 4 above.

In step 616, the first worker node performs forward propagation computations for the first neural network layer based on the updated weights. The forward propagation computations are of a second batch and based on a different subportion of input data from the first batch.

In step 618, the first worker node executes the remaining exchange tasks of the first plurality of exchange tasks to exchange the remaining portions of the second layer weight gradients with the other worker nodes; at least some of the remaining exchange tasks are executed in parallel with the updating of the weights for the first neural network layer and the forward propagation computations for the first neural network layer. After the exchange of the first layer weight gradients is completed in step 614, the first worker node can start executing the remaining exchange tasks of the first plurality of exchange tasks in parallel with the updating of the weights for the first neural network layer of step 616, followed by the forward propagation computations for the first neural network layer. After the exchange of the second weight gradients completes, exchange processor 414 can determine averaged second layer weight gradients based on averaging the second layer weight gradients generated by the first worker node and the second layer weight gradients received from other worker nodes.

In step 620, the first worker node updates the weights for the second neural network layer based on the averaged second layer weight gradients. The updating can be based on Equation 4 above. Following the updating of the weights for the second neural network layer, the first worker node can perform second batch forward propagation operations for the second neural network layer.

Figure 7:
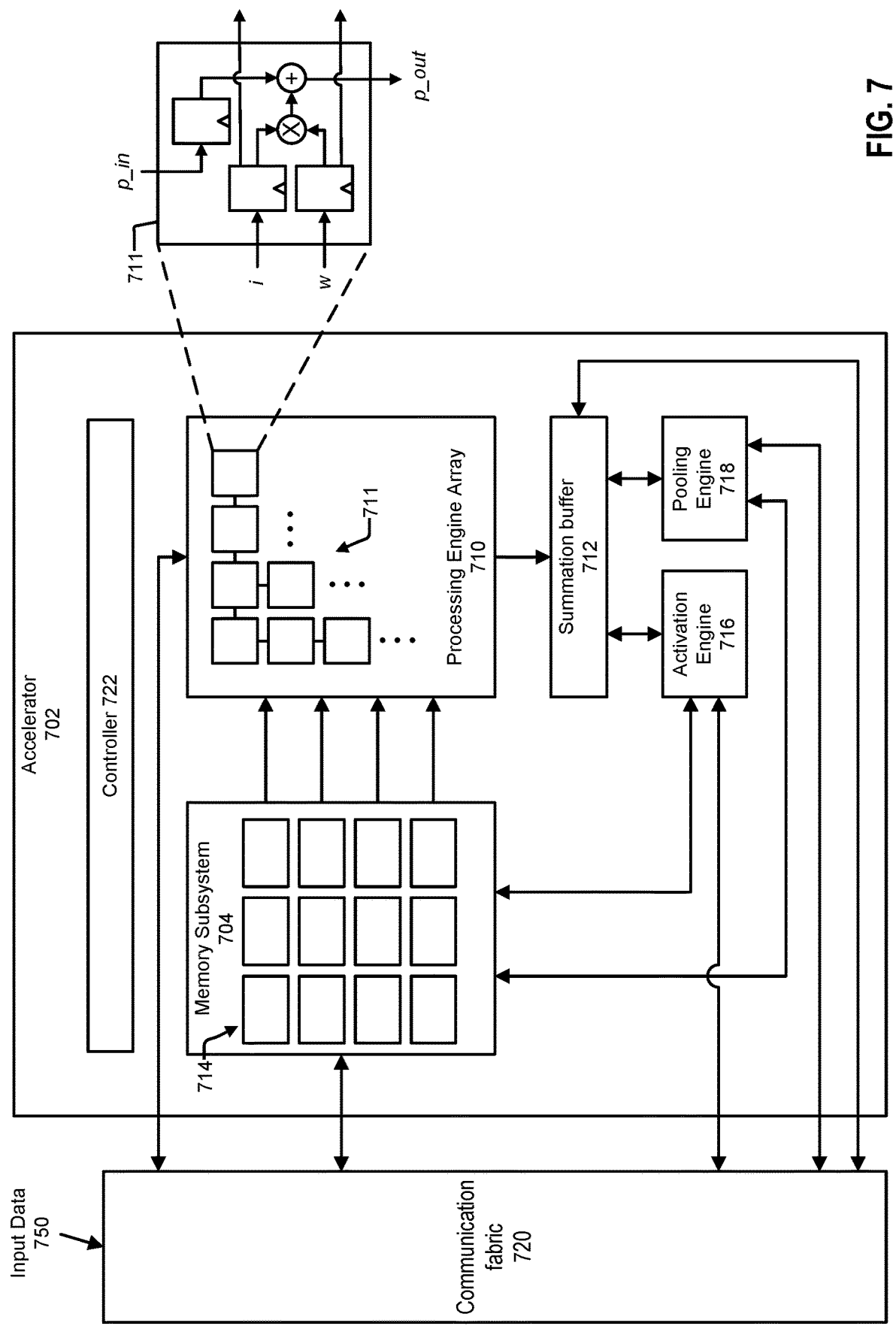
FIG. 7 illustrates an example of an integrated circuit device that can support the example training processes of FIGS. 4A-4C.

FIG. 7 is a block diagram illustrating an example of an integrated circuit device that can be configured to perform various types of neural network operations, such as those described in FIG. 2A-FIG. 3B and can be part of neural network processor 412 of FIG. 4A-FIG. 4C. The example of FIG. 7 illustrates an accelerator 702. In various examples, the accelerator 702, for a set of input data (e.g., input data 750), can execute computations using a processing engine array 710, an activation engine 716, and/or a pooling engine 718. The processor may have other integrated circuit components, including additional accelerator engines. Accelerator 702 may include a controller 722 to control the operations of processing engine array 710, activation engine 716, and/or pooling engine 718.

In various implementations, the memory subsystem 704 can include multiple memory banks 714. In these implementations, each memory bank 714 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 714. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 704 can permit simultaneous access to the read or write channels of multiple memory banks. As another example, the memory subsystem 704 can include arbitration logic such that arbitration between, for example, the outputs of multiple memory banks 714 can result in more than one memory bank's output being used. In these and other examples, though globally managed by the memory subsystem 704, each memory bank can be operated independently of any other.

Having the memory banks 714 be independently accessible can increase the efficiency of the accelerator 702. For example, values can be simultaneously read and provided to each row of the processing engine array 710, so that the entire processing engine array 710 can be in use in one clock cycle. As another example, the memory banks 714 can be read at the same time that results computed by the processing engine array 710 are written to the memory subsystem 704. In contrast, a single memory may be able to service only one read or write at a time. With a single memory, multiple clock cycles can be required, for example, to read input data for each row of the processing engine array 710 before the processing engine array 710 can be started.

In various implementations, the memory subsystem 704 can be configured to simultaneously service multiple clients, including the processing engine array 710, the activation engine 716, the pooling engine 718, and any external clients that access the memory subsystem 704 over a communication fabric 720. In some implementations, being able to service multiple clients can mean that the memory subsystem 704 has at least as many memory banks as there are clients. In some cases, each row of the processing engine array 710 can count as a separate client. In some cases, each column of the processing engine array 710 can output a result, such that each column can count as a separate write client. In some cases, output from the processing engine array 710 can be written into the memory banks 714 that can then subsequently provide input data for the processing engine array 710. As another example, the activation engine 716 and the pooling engine 718 can include multiple execution channels, each of which can be separate memory clients. The memory banks 714 can be implemented, for example, using static random access memory (SRAM).

In various implementations, the memory subsystem 704 can include control logic. The control logic can, for example, keep track of the address spaces of each of the memory banks 714, identify memory banks 714 to read from or write to, and/or move data between the memory banks 714. In some implementations, memory banks 714 can be hardwired to particular clients. For example, a set of memory banks 714 can be hardwired to provide values to the rows of the processing engine array 710, with one memory bank servicing each row. As another example, a set of memory banks can be hard wired to receive values from columns of the processing engine array 710, with one memory bank receiving data for each column.

The processing engine array 710 is the computation matrix of the example accelerator 702. The processing engine array 710 can, for example, execute parallel integration, convolution, correlation, and/or matrix multiplication, among other things. The processing engine array 710 includes multiple processing engines 711, arranged in rows and columns, such that results output by one processing engine 711 can be input directly into another processing engine 711. Processing engines 711 that are not on the outside edges of the processing engine array 710 thus can receive data to operate on from other processing engines 711, rather than from the memory subsystem 704.

In various examples, the processing engine array 710 uses systolic execution, in which data arrive at each processing engine 711 from different directions at regular intervals. In some examples, input data can flow into the processing engine array 710 from the left and weight values can be loaded at the top. In some examples weights and input data can flow from the left and partial sums can flow from top to bottom. In these and other examples, a multiply-and-accumulate operation moves through the processing engine array 710 as a diagonal wave front, with data moving to the right and down across the array. Control signals can be input at the left at the same time as weights, and can flow across and down along with the computation.

In various implementations, the number of columns in the processing engine array 710 determines the computational capacity of the processing engine array 710, and the number of rows determines the required memory bandwidth for achieving maximum utilization of the processing engine array 710. The processing engine array 710 can have, for example, 64 columns and 64 rows, or some other number of columns and rows.

An example of a processing engine 711 is illustrated in FIG. 7 in an inset diagram. As illustrated by this example, a processing engine 711 can include a multiplier-accumulator circuit. Inputs from the left can include, for example, input data i and a weight value w, where the input data are values taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 711.

In the illustrated example, an input from above can include a partial sum, p_in, provided either from another processing engine 711 or from a previous round of computation by the processing engine array 710. When starting a computation for a new set of input data, the top row of the processing engine array 710 can receive a fixed value for p_in, such as zero. As illustrated by this example, i and w are multiplied together and the result is summed with p_in to produce a new partial sum, p_out, which can be input into another processing engine 711. Various other implementations of the processing engine 411 are possible.

Outputs from the last row in the processing engine array 710 can be temporarily stored in summation buffer 712. The results can be intermediate results, which can be written to the memory banks 714 to be provided to the processing engine array 710 for additional computation. Alternatively, the results can be final results, which, once written to the memory banks 714, can be read from the memory subsystem 704 over the communication fabric 720 to be output by the system.

In some implementations, the accelerator 702 includes an activation engine 716. In these implementations, the activation engine 716 can combine the results from the processing engine array 710 into one or more output activations. For example, for a convolutional neural network, convolutions from multiple channels can be summed to produce an output activation for a single channel. In other examples, accumulating results from one or more columns in the processing engine array 710 may be needed to produce an output activation for a single node in the neural network. In some examples, activation engine 716 can be bypassed.

In various examples, the activation engine 716 can include multiple separate execution channels. In these examples, the execution channels can correspond to the columns of the processing engine array 710, and can perform an operation on the outputs of a column, the result of which can be stored in the memory subsystem 704. In these examples, the activation engine 716 may be able to perform between 1 and n parallel computations, where n is equal to the number of columns in the processing engine array 710. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 702 can include a pooling engine 718. Pooling is the combining of outputs of the columns of the processing engine array 710. Combining can include, for example, computing a maximum value, a minimum value, an average value, a median value, a summation, a multiplication, or another logical or mathematical combination. In various examples, the pooling engine 718 can include multiple execution channels that can operate on values from corresponding columns of the processing engine array 710. In these examples, the pooling engine 718 may be able to perform between 1 and n parallel computations, where n is equal to the number of columns in the processing engine array 710. In various examples, execution channels of the pooling engine 718 can operate in parallel and/or simultaneously. In some examples, the pooling engine 718 can be bypassed.

Herein, the activation engine 716 and the pooling engine 718 may be referred to collectively as execution engines. The processing engine array 710 is another example of an execution engine. Another example of an execution engine is a Direct Memory Access (DMA) engine, which may be located outside the accelerator 702.

Input data 750 can arrive over the communication fabric 720. The communication fabric 720 can connect the accelerator 702 to other components of a processor, such as a DMA engine that can obtain input data 750 from an Input/Output (I/O) device, a storage drive, or a network interface. The input data 750 can be, for example, one-dimensional data, such as a character string or numerical sequence, or two-dimensional data, such as an array of pixel values for an image or frequency and amplitude values over time for an audio signal. In some examples, the input data 750 can be three-dimensional, as may be the case with, for example, the situational information used by a self-driving car or virtual reality data. In some implementations, the memory subsystem 704 can include a separate buffer for the input data 750. In some implementations, the input data 750 can be stored in the memory banks 714 when the accelerator 702 receives the input data 750.

In some examples, the accelerator 702 can implement a neural network processing engine. Accelerator 702 can execute a neural network to perform a task for which the neural network was trained for a set of input data 750, such as performing an inference task. Accelerator 702 can also execute various operations of a training process, such as forward propagation operations, backward propagation operations, weight updating operations, etc., to update the weights for the neural network. For example, processing engine array 710 can be controlled to perform forward propagation computations according to Equation 1 to support an inference task, and forward propagation computations and backward propagation computations based on Equation 1 to support a training process.

The weights for the neural network can be stored in the memory subsystem 704, along with input data 750 on which the neural network will operate. The addresses of the weights and input data 750 in memory subsystem 704 can be based on or mapped to the coordinates of the weights and input data 750 in, respectively, a weight data array and an input data array, which allows the weight and the input data to be retrieved based on addresses derived from their coordinates. The neural network can also include instructions, which can be executed by controller 722 to control the processing engine array 710 to perform various computations on the weights and the input data to support an inference task or a training process. The instructions can be generated by a compiler and can also be stored in the memory subsystem 704, in the memory banks 714 or in a separate instruction buffer. The processing engine array 710 can output intermediate results, which represent the outputs of individual layers of the neural network. In some cases, the activation engine 716 and/or pooling engine 718 may be enabled for computations called for by certain layers of the neural network. The accelerator 702 can store the intermediate results in the memory subsystem 704 for inputting into the processing engine array 710 to compute results for the next layer of the neural network. The processing engine array 710 can further output final results from a last layer of the neural network. The final results can be stored in the memory subsystem 704 and then be copied out to host processor memory or to another location.

Figure 8:
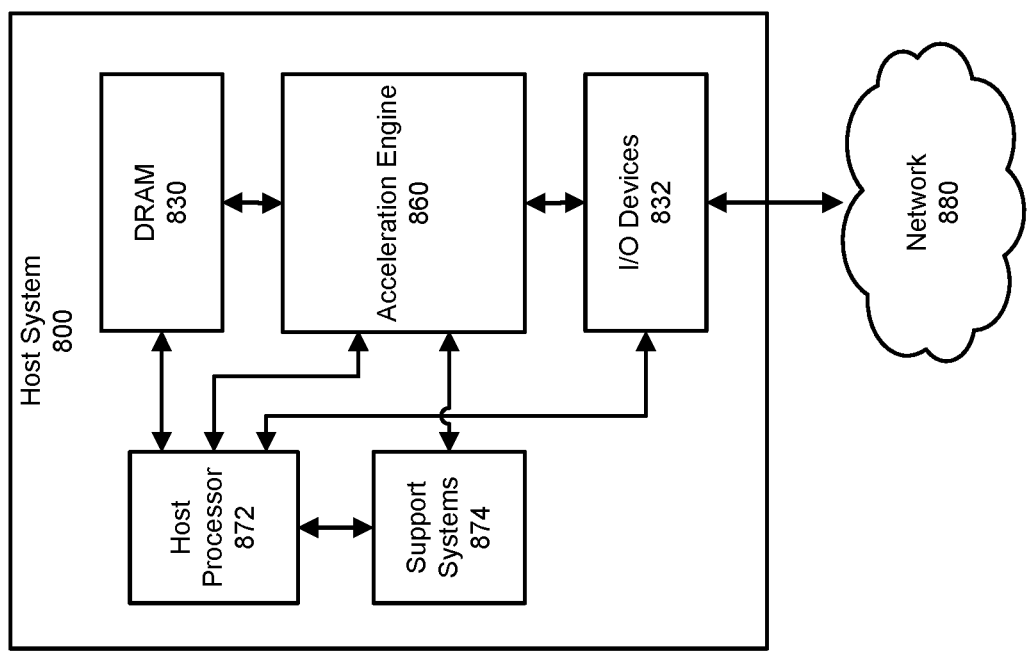
FIG. 8 illustrates an example of a host system that can support the example training processes of FIGS. 4A-4C.

FIG. 8 includes a block diagram that illustrates an example of a host system 800 in which an acceleration engine 860 can be used. The acceleration engine 860 of FIG. 8 is an example of a device that can include one or more accelerators such as is illustrated in FIG. 7. Host system 800 can be configured as a worker node and can be computing system 402 of FIG. 4A. The example host system 800 of FIG. 8 includes the acceleration engine 860, a host processor 872, DRAM 830 or processor memory, I/O devices 832, and support systems 874. In various implementations, the host system 800 can include other hardware that is not illustrated here.

The host processor 872 is a general purpose integrated circuit that is capable of executing program instructions. In some examples, the host processor 872 can include multiple processing cores. A multi-core processor may include multiple processing units within the same processor. In some examples, the host system 800 can include more than one host processor 872. In some examples, the host processor 872 and the acceleration engine 860 can be one chip, such as, one or more integrated circuits within the same package.

In various examples, the host processor 872 can communicate with other components in the host system 800 over one or more communication channels. For example, the host system 800 can include a host processor bus, which the host processor 872 can use to communicate with the DRAM 830, for example. As another example, the host system 800 can include an I/O bus, such as a PCI-based bus, over which the host processor 872 can communicate with the acceleration engine 860 and/or the I/O devices 832, for example. In various examples, the host system 800 can, alternatively or additionally, include other communication channels or busses, such as serial busses, power management busses, storage device busses, and so on.

In some examples, software programs executing on the host processor 872 can receive or generate input for processing by the acceleration engine 860. In some examples, the programs can select an appropriate neural network to execute for a given input. For example, a program may be for language translation, and can select one or more neural networks capable of speech recognition and/or machine translation. In these and other examples, the programs can configure the acceleration engine 860 with the neural network to execute, and/or can select a neural network processing engine on the acceleration engine 860 that has previously been configured to execute the desired neural network. In some examples, once the acceleration engine 860 has started an inference on input data, the host processor 872 can manage the movement of data (such as weights, instructions, intermediate results, results of conditional layers, and/or final results) into or out of the acceleration engine 860.

In some examples, a software program that is using the acceleration engine 860 to conduct an inference can read the result from a conditional layer from the acceleration engine 860 and/or from a storage location, such as in DRAM 830. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinated by software.

The DRAM 830 is memory that is used by the host processor 872 for storage of program code that the host processor 872 is in the process of executing, as well as values that are being operated on. In some examples, the data for a neural network (e.g., weight values, instructions, and other data) can be all or partially stored in the DRAM 830. DRAM is a common term for processor memory, and though DRAM is volatile memory, processor memory can be volatile and/or non-volatile. Though not illustrated here, the host system 800 can include other volatile and non-volatile memories for other purposes. For example, the host system 800 can include a Read-Only Memory (ROM) that stores boot code for booting the host system 800 at power on, and/or Basic Input/Output System (BIOS) code.

Though not illustrated here, the DRAM 830 can store instructions for various programs, which can be loaded into and be executed by the host processor 872. For example, the DRAM 830 can be storing instructions for an operating system, one or more data stores, one or more application programs, one or more drivers, and/or services for implementing the features disclosed herein.

The operating system can manage and orchestrate the overall operation of the host system 800, such as scheduling tasks, executing applications, and/or controller peripheral devices, among other operations. In some examples, a host system 800 may host one or more virtual machines. In these examples, each virtual machine may be configured to execute its own operating system. Examples of operating systems include UNIX, LINUX, WINDOWS, MAC OS, IOS, ANDROID, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers. Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 800. For example, some drivers can provide communication between the operating system and peripheral devices or I/O devices 832. Alternatively or additionally, some drivers may provide communication between application programs and the operating system, and/or application programs and peripheral devices accessible to the host system 800. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 832 can include hardware for connecting to user input and output devices, such as keyboards, mice, pens, tablets, voice input devices, touch input devices, displays or monitors, speakers, and printers, among other devices. The I/O devices 832 can also include storage drives and/or network interfaces for connecting to a network 880. For example, the host system 800 can use a network interface to communicate with storage devices, user terminals, other computing devices or servers, and/or other networks, among various examples.

In various examples, one or more of the I/O devices 832 can be storage devices. In these examples, the storage devices include non-volatile memory and can store program instructions and/or data. Examples of storage devices include magnetic storage, optical disks, solid state disks, flash memory, and/or tape storage, among others. The storage device can be housed in the same chassis as the host system 800 or may be in an external enclosure. A storage device can be fixed (e.g., attached by screws) or removable (e.g., having a physical release mechanism and possibly a hot-plug mechanism).

Storage devices, the DRAM 830, and any other memory component in the host system 800 are examples of computer-readable storage media. Computer-readable storage media are physical mediums that are capable of storing data in a format that can be read by a device such as the host processor 872. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. As used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

Figure 9:
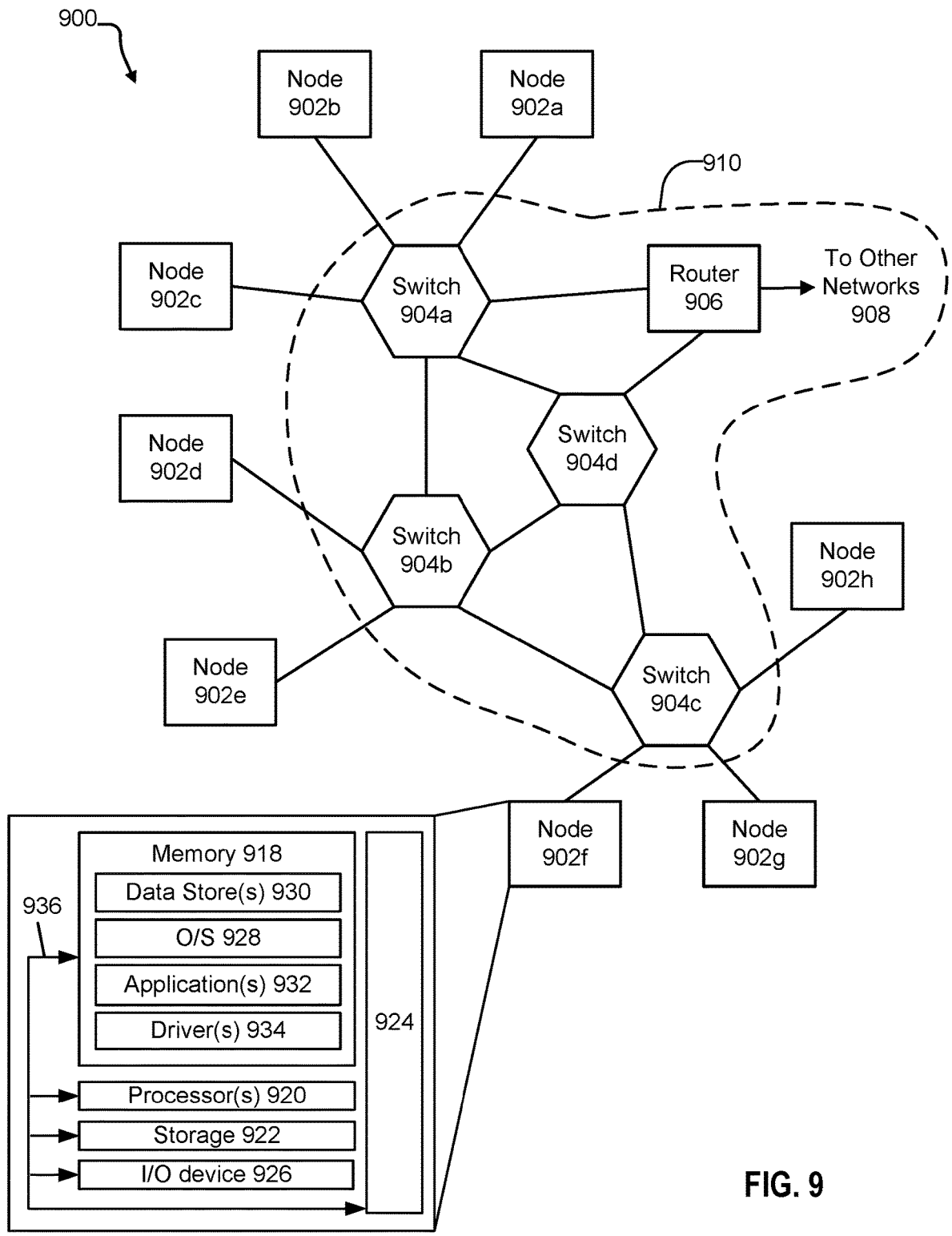
FIG. 9 includes a diagram of an example network.

FIG. 9 includes a diagram of an example network 900, which can include one or more host systems, such as the host system illustrated in FIG. 8. For example, the example network 900 of FIG. 9 includes multiple nodes 902a-902h, one or more of which can be a host system such as is illustrated in FIG. 8. Others of the nodes 902a-902h can be other computing devices, each of which include at least a memory for storing program instructions, a processor for executing the instructions, and a network interface for connecting to the network 900.

In various examples, the network 900 can be used to process data. For example, input data can be received at one of the nodes 902a-902h or from other networks 908 with which the network 900 can communicate. In this example, the input data can be directed to a node in the network 900 that includes an acceleration engine, for the acceleration engine to operate on and produce a result. The result can then be transferred to the node or other network from which the input data was received. In various examples, input data can be accumulated from various sources, including one or more of the nodes 902a-902h and/or computing devices located in the other networks 908, and the accumulated input data can be directed to one or more host systems in the network 900. Results from the host systems can then be distributed back to the sources from which the input data were gathered.

In various examples, one or more of the nodes 902a-902h can be responsible for operations such as accumulating input data for host systems to operate on, keeping track of which host systems are busy and which can accept more work, determining whether the host systems are operating correctly and/or most efficiently, monitoring network security, and/or other management operations.

In the example of FIG. 9, the nodes 902a-902h are connected to one another using a switched architecture with point-to point links. The switched architecture includes multiple switches 904a-904d, which can be arranged in a multi-layered network such as a Clos network. A network device that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. The switches 904a-904d of FIG. 9 may be connected to the nodes 902a-902h and provide multiple paths between any two nodes.

The network 900 may also include one or more network devices for connection with other networks 908, such as a router 906. Routers use headers and forwarding tables to determine the best path for forwarding the packets, and use protocols such as internet control message protocol (ICMP) to communicate with each other and configure the best route between any two devices. The router 906 of FIG. 9 can be used to connect to other networks 908 such as subnets, LANs, wide area networks (WANs), and/or the Internet.

In some examples, network 900 may include any one or a combination of many different types of networks, such as cable networks, the Internet, wireless networks, cellular networks and other private and/or public networks. The interconnected switches 904a-904d and the router 906, if present, may be referred to as a switch fabric 910, a fabric, a network fabric, or simply a network. In the context of a computer network, terms "fabric" and "network" may be used interchangeably herein.

The nodes 902a-902h may be any combination of host systems, processor nodes, storage subsystems, and I/O chassis that represent user devices, service provider computers or third party computers.

User devices may include computing devices to access an application 932 (e.g., a web browser or mobile device application). In some aspects, the application 932 may be hosted, managed, and/or provided by a computing resources service or service provider. The application 932 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 908. Additionally, the user device(s) may be part of the distributed system managed by, controlled by, or otherwise part of the service provider computer(s) (e.g., a console device integrated with the service provider computers).

The node(s) of FIG. 9 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some examples, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 932 and/or cloud-based software services. These servers may be configured as part of an integrated, distributed computing environment. In some aspects, the service provider computer(s) may, additionally or alternatively, include computing devices such as a mobile phone, a smart phone, a personal digital assistant (PDA), a laptop computer, a desktop computer, a netbook computer, a server computer, a thin-client device, a tablet computer, a gaming console, etc. In some instances, the service provider computer(s) may communicate with one or more third party computers.

In one example configuration, the node(s) 902a-902h may include at least one memory 918 and one or more processing units (or processor(s) 920). The processor(s) 920 may be implemented in hardware, computer-executable instructions, firmware, or combinations thereof. Computer-executable instruction or firmware implementations of the processor(s) 920 may include computer-executable or machine-executable instructions written in any suitable programming language to perform the various functions described.

In some instances, the hardware processor(s) 920 may be a single core processor or a multi-core processor. A multi-core processor may include multiple processing units within the same processor. In some examples, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 918 may store program instructions that are loadable and executable on the processor(s) 920, as well as data generated during the execution of these programs. Depending on the configuration and type of the node(s) 902a-902h, the memory 918 may be volatile (such as RAM) and/or non-volatile (such as ROM, flash memory, etc.). The memory 918 may include an operating system 928, one or more data stores 930, one or more application programs 932, one or more drivers 934, and/or services for implementing the features disclosed herein.

The operating system 928 may support nodes 902a-902h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include UNIX, LINUX, WINDOWS, MAC OS, IOS, ANDROID, and the like. The operating system 928 may also be a proprietary operating system.

The data stores 930 may include permanent or transitory data used and/or operated on by the operating system 928, application programs 932, or drivers 934. Examples of such data include web pages, video data, audio data, images, user data, and so on. The information in the data stores 930 may, in some implementations, be provided over the network(s) 908 to user devices. In some cases, the data stores 930 may additionally or alternatively include stored application programs and/or drivers. Alternatively or additionally, the data stores 930 may store standard and/or proprietary software libraries, and/or standard and/or proprietary application user interface (API) libraries. Information stored in the data stores 930 may be machine-readable object code, source code, interpreted code, or intermediate code.

The drivers 934 include programs that may provide communication between components in a node. For example, some drivers 934 may provide communication between the operating system 928 and additional storage 922, network device 924, and/or I/O device 926. Alternatively or additionally, some drivers 934 may provide communication between application programs 932 and the operating system 928, and/or application programs 932 and peripheral devices accessible to the service provider computer. In many cases, the drivers 934 may include drivers that provide well-understood functionality (e.g., printer drivers, display drivers, hard disk drivers, Solid State Device drivers). In other cases, the drivers 934 may provide proprietary or specialized functionality.

The service provider computer(s) or servers may also include additional storage 922, which may include removable storage and/or non-removable storage. The additional storage 922 may include magnetic storage, optical disks, solid state disks, flash memory, and/or tape storage. The additional storage 922 may be housed in the same chassis as the node(s) 902a-902h or may be in an external enclosure. The memory 918 and/or additional storage 922 and their associated computer-readable media may provide non-volatile storage of computer-readable instructions, data structures, program modules, and other data for the computing devices. In some implementations, the memory 918 may include multiple different types of memory, such as SRAM, DRAM, or ROM.

The memory 918 and the additional storage 922, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 918 and the additional storage 922 are examples of computer storage media. Additional types of computer storage media that may be present in the node(s) 902a-902h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 902a-902h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 902a-902h may also include I/O device(s) 926, such as a keyboard, a mouse, a pen, a voice input device, a touch input device, a display, speakers, a printer, and the like. The node(s) 902a-902h may also include one or more communication channels 936. A communication channel 936 may provide a medium over which the various components of the node(s) 902a-902h can communicate. The communication channel or channels 936 may take the form of a bus, a ring, a switching fabric, or a network.

The node(s) 902a-902h may also contain network device(s) 924 that allow the node(s) 902a-902h to communicate with a stored database, another computing device or server, user terminals and/or other devices on the network(s) 900.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method of training a neural network model in a distributed system, the distributed system comprising a first worker node and a second worker node, the neural network model comprising a first neural network layer and a second neural network layer, the method being performed by the first worker node and comprising:
    performing, by the first worker node, backward propagation computations for the second neural network layer to generate second layer data gradients and second layer weight gradients;
    generating, by the first worker node, a first plurality of exchange tasks each corresponding to an exchange of a portion of the second layer weight gradients with the second worker node;
    executing a first exchange task of the first plurality of exchange tasks to exchange a first portion of the second layer weight gradients with the second worker node;
    performing, by the first worker node, backward propagation computations for the first neural network layer based on the second layer data gradients to generate first layer data gradients and first layer weight gradients;
    generating, by the first worker node, a second plurality of exchange tasks each corresponding to an exchange of a portion of the first layer weight gradients with the second worker node;
    after the execution of the first exchange task completes and before executing remaining exchange tasks of the first plurality of exchange tasks, executing all of the second plurality of exchange tasks to exchange the first layer weight gradients with the second worker node, such that the second plurality of exchange tasks are prioritized over the first plurality of exchange tasks;
    updating weights for the first neural network layer based on the exchanged first layer weight gradients;
    performing, by the first worker node, forward propagation computations for the first neural network layer based on the updated weights;
    executing the remaining exchange tasks of the first plurality of exchange tasks to exchange the remaining portions of the second layer weight gradients with the second worker node; and
    updating weights for the second neural network layer based on the exchanged second layer weight gradients.

2. The method of claim 1, wherein the backward propagation computations for the first neural network layer are performed in parallel with the exchange of the first portion of the second layer weight gradients with the second worker node.

3. The method of claim 1, wherein exchange of the portion of the second layer weight gradients with the second worker node comprises:
    transmitting, to the second worker node, the first portion of the second layer weight gradients generated at the first worker node;
    receiving, by the first worker node and from the second worker node, a first portion of the second layer weight gradients generated at the second worker node;
    determining, by the first worker node, averaged second weight gradients based on averaging the first portion of the second layer weight gradients generated at the first worker node with the first portion of the second layer weight gradients generated at the second worker node; and
    updating the weights for the second neural network layer using the averaged second weight gradients.

4. The method of claim 1, further comprising:
    storing the first plurality of exchange tasks in a buffer;
    retrieving the first exchange task from the buffer for execution;

storing the second plurality of exchange tasks in the buffer; and responsive to the second plurality of exchange tasks being stored in the buffer and the execution of the first exchange task being completed, retrieving the second plurality of exchange tasks from the buffer for execution before executing the remaining exchange tasks of the first plurality of exchange tasks.

5. The method of claim 1, wherein the first and second weight gradients are exchanged over a network; and
wherein a size of each portion of the first and second weight gradients is determined based on at least one of: a certain degree of network efficiency in transmitting the weight gradients between the first worker node and the second worker node, or a target time of completion of the training of the neural network model.

6. The method of claim 1, further comprising:
performing forward propagation computations for the first neural network layer based on the updated weights for the first neural network layer,
wherein the forward propagation computations for the first neural network layer are performed in parallel with the exchange of at least some of the remaining portions of the second layer weight gradients.

7. A non-transitory computer readable medium storing instructions that, when executed by one or more hardware processors of a first computer system, cause the one or more hardware processors to:
perform, at the first computer system, backward propagation computations for a second layer of a neural network to generate second weight gradients;
split, at the first computer system, the second weight gradients into portions;
cause a hardware interface to exchange a first portion of the second weight gradients with a second computer system separate from the first computer system;
perform, at the first computer system, backward propagation computations for a first layer of the neural network to generate first weight gradients when the exchange of the first portion of the second weight gradients is underway, the first layer being a lower layer than the second layer in the neural network;
after transmission of the first portion of the second weight gradients completes and before transmitting remaining portions of the second weight gradients, cause the hardware interface to transmit all of the first weight gradients to the second computer system, such that the first weight gradients are prioritized over the second weight gradients; and
after the transmission of the first weight gradients completes, cause the hardware interface to transmit the remaining portions of the second weight gradients to the second computer system.

8. The non-transitory computer readable medium of claim 7, wherein the second weight gradients are generated before the first weight gradients.

9. The non-transitory computer readable medium of claim 7, further storing instructions that, when executed by one or more hardware processors, cause the one or more hardware processors to:
assign each portion of the second weight gradients to each of a plurality of first exchange tasks;
store the plurality of first exchange tasks sequentially in a buffer;
receive an indication that a hardware interface is idle;
retrieve a first exchange task of the plurality of first exchange tasks from the buffer; and
execute the first exchange task based on:
causing the hardware interface to transmit the first portion of the second weight gradients assigned to the one of the plurality of first exchange tasks to the second computer system; and
receiving third weight gradients from the second computer system via the hardware interface.

10. The non-transitory computer readable medium of claim 9, further storing instructions that, when executed by one or more hardware processors, cause the one or more hardware processors to:
divide the first weight gradients into a plurality of portions;
assign each portion of the first weight gradients to each of a plurality of second exchange tasks;
store the plurality of second exchange tasks sequentially in the buffer after the plurality of first exchange tasks; and
responsive to determining that the transmission of the portion of the second weight gradients and the reception of the third weight gradients is complete:
retrieve each of the plurality of second exchange tasks from the buffer sequentially; and
execute the each of the plurality of second exchange tasks based on causing the hardware interface to transmit each portion of the first weight gradients assigned to the each of the plurality of second exchange tasks;
retrieve each of the remaining first exchange tasks from the buffer sequentially; and
execute the each of the remaining first exchange tasks based on causing the hardware interface to transmit each portion of the second weight gradients assigned to the each of the remaining first exchange tasks.

11. The non-transitory computer readable medium of claim 10, wherein the plurality of second exchange tasks are retrieved from the buffer before the remaining first exchange tasks based on the first layer being a lower layer than the second layer in the neural network.

12. The non-transitory computer readable medium of claim 10, wherein the plurality of second exchange tasks are retrieved from the buffer before the remaining first exchange tasks based on the plurality of second exchange tasks being stored in the buffer later than the plurality of first exchange tasks.

13. The non-transitory computer readable medium of claim 10, wherein the plurality of second exchange tasks are retrieved from the buffer sequentially in a reverse order from which the plurality of second exchange tasks are stored in the buffer; and
wherein each portion of the first weight gradients is transmitted following the order by which the plurality of second exchange tasks are retrieved from the buffer.

14. The non-transitory computer readable medium of claim 10, wherein a size of each portion of the first and second weight gradients is determined based on at least one of: a certain degree of network efficiency in transmitting the weight gradients to the second computer system, or a target time of completion of the training of the neural network.

15. The non-transitory computer readable medium of claim 10, further storing instructions that, when executed by one or more hardware processors, cause the one or more hardware processors to:
cause a hardware interface to transmit at least a portion of the second weight gradients to the second computer system when performing the backward propagation computations for the first layer, wherein the third weight gradients are transmitted by the second computer system in response to receiving the at least a portion of the second weight gradients.

16. The non-transitory computer readable medium of claim 7, further storing instructions that, when executed by one or more hardware processors, cause the one or more hardware processors to:
perform forward propagation computations for the first layer; and
cause a hardware interface to transmit at least a portion of the second weight gradients to the second computer system when performing the forward propagation computations for the first layer.

17. An apparatus, comprising:
a neural network processor;
a hardware interface;
an integrated circuit comprising a weight gradients splitter and an exchange processor; and
a controller configured to:
control the neural network processor configured to perform backward propagation computations for a second layer of a neural network to generate second weight gradients;
control the weight gradients splitter to split the second weight gradients into portions;
control, via the exchange processor, the hardware interface to exchange a first portion of the second weight gradients with a second computer system separate from the apparatus, wherein the apparatus is a first computer system;
control the neural network processor to perform backward propagation computations for a first layer of the neural network to generate first weight gradients when the exchange of the first portion of the second weight gradients is underway, the first layer being a lower layer than the second layer in the neural network;
after transmission of the first portion of the second weight gradients completes and before transmitting remaining portions of the second weight gradients, control, via the exchange processor, the hardware interface to transmit all of the first weight gradients to the second computer system, such that the first weight gradients are prioritized over the second weight gradients; and
after the transmission of the first weight gradients is complete, control, via the exchange processor, the hardware interface to transmit the remaining portions of the second weight gradients to the second computer system.

18. The apparatus of claim 17, wherein the controller is configured to control the neural network processor to perform forward propagation computations for the second layer in parallel with the transmission of at least a part of the remaining portions of the second weight gradient to the second computer system.

19. The apparatus of claim 17, further comprising a memory that stores a buffer;
wherein the exchange processor is configured to:
assign each portion of the second weight gradients to each of a plurality of first exchange tasks;
store the plurality of first exchange tasks sequentially in the buffer;
receive an indication that a hardware interface is idle;
retrieve a first exchange task of the plurality of first exchange tasks from the buffer; and
execute the first exchange task based on:
controlling the hardware interface to transmit the first portion of the second weight gradients assigned to the one of the plurality of first exchange tasks to the second computer system; and
receiving third weight gradients from the second computer system via the hardware interface.

20. The apparatus of claim 19, wherein a plurality of second exchange tasks associated with the first weight gradients are retrieved from the buffer before the remaining first exchange tasks based on the plurality of second exchange tasks being stored in the buffer later than the plurality of first exchange tasks.

* * * * *